United States Patent [19]
Kaneko

[11] Patent Number: 5,661,576
[45] Date of Patent: Aug. 26, 1997

[54] COLOR FACSIMILE APPARATUS WHICH SELECTIVELY DISPLAYS AN IMAGE INDICATED BY COMPRESSED IMAGE DATA OR FORMS AN IMAGE INDICATED BY THE COMPRESSED IMAGE DATA

[75] Inventor: Yoji Kaneko, Yokohama, Japan

[73] Assignee: Canon Kabushiki Kaisha, Tokyo, Japan

[21] Appl. No.: 536,380

[22] Filed: Sep. 29, 1995

Related U.S. Application Data

[62] Division of Ser. No. 255,814, Jun. 7, 1994, Pat. No. 5,485,283, which is a continuation of Ser. No. 758,799, Sep. 12, 1991, abandoned.

[30] Foreign Application Priority Data

Sep. 14, 1990 [JP] Japan .................................. 2-245029

[51] Int. Cl.$^6$ ................................. H04N 1/41; H04N 1/64
[52] U.S. Cl. ................................. 358/539; 358/426
[58] Field of Search ................................. 358/530, 539, 358/426, 443, 468

[56] References Cited

U.S. PATENT DOCUMENTS

| 4,739,397 | 4/1988 | Hayashi | 358/530 |
| 5,198,898 | 3/1993 | Miyata | 358/500 |
| 5,220,417 | 6/1993 | Sugiura | 358/468 |
| 5,355,159 | 10/1994 | Kaneko . | |
| 5,361,144 | 11/1994 | Sugiura | 358/539 |

FOREIGN PATENT DOCUMENTS

| 383331 | 8/1990 | European Pat. Off. | H04N 1/46 |
| 395405 | 10/1990 | European Pat. Off. | H04N 1/32 |

*Primary Examiner*—Scott A. Rogers
*Attorney, Agent, or Firm*—Fitzpatrick, Cella, Harper & Scinto

[57] ABSTRACT

A facsimile apparatus capable of transmitting color image and monochromatic image comprises:

a transmission means for transmitting given color image data in a color transmission mode or in a monochromatic transmission mode;

a monitor for visually displaying a color image data; and a control means for controlling the monitor according to the transmission mode of the transmission means.

8 Claims, 21 Drawing Sheets

HORIZONTAL 1120 →
VERTICAL 800 ↓
DISPLAY

UNIT:PIXEL NUMBER

3308 → 4676 →
4677 ↓
6614 ↓
A4
A3

UNIT:PIXEL NUMBER(400×400dpi)

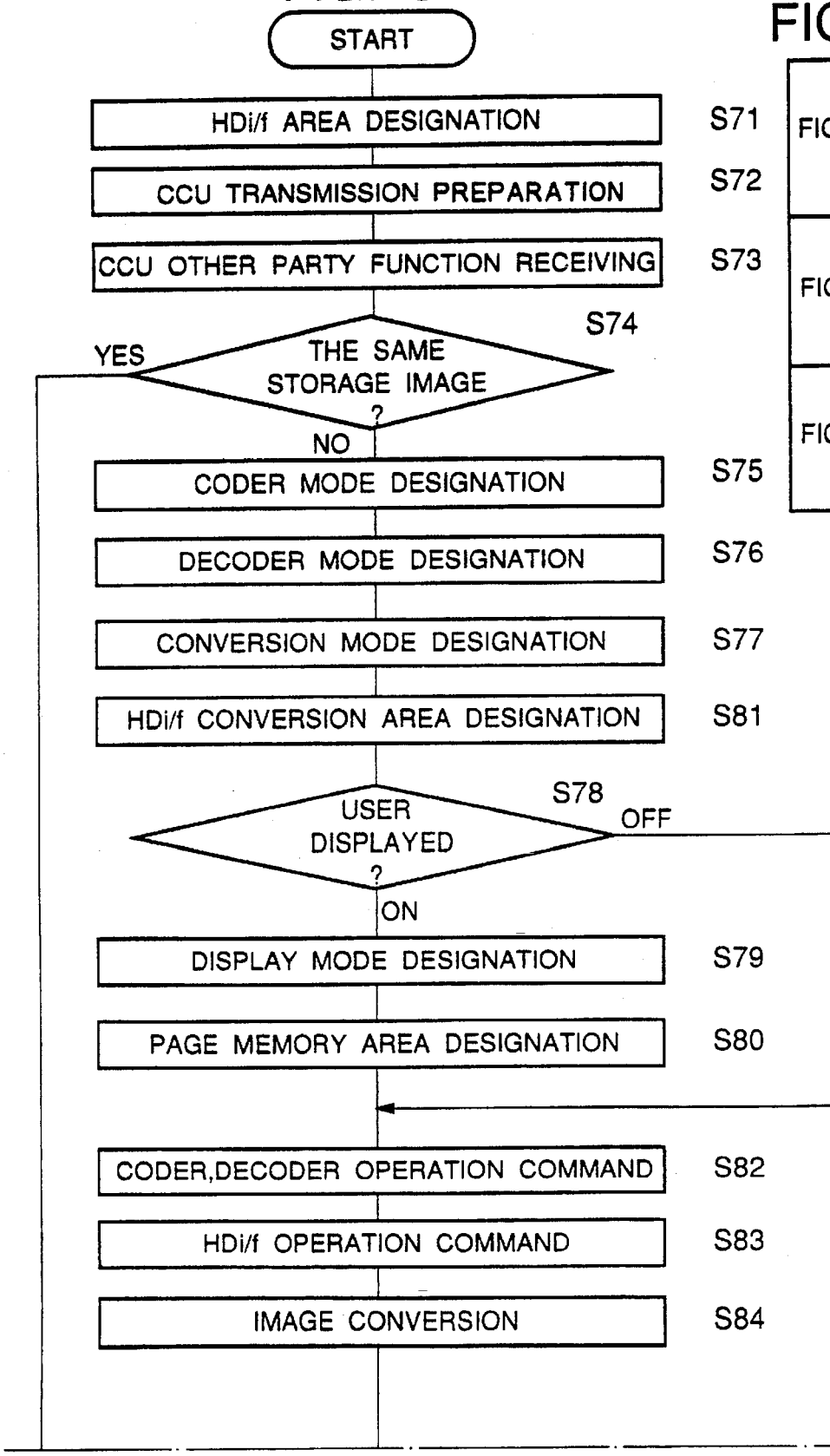
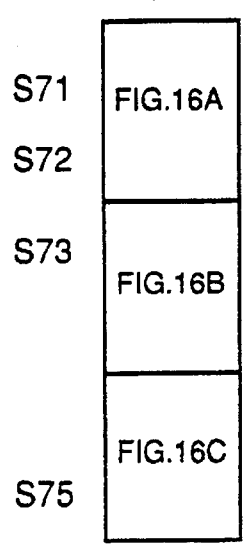
FIG.16A
FIG.16

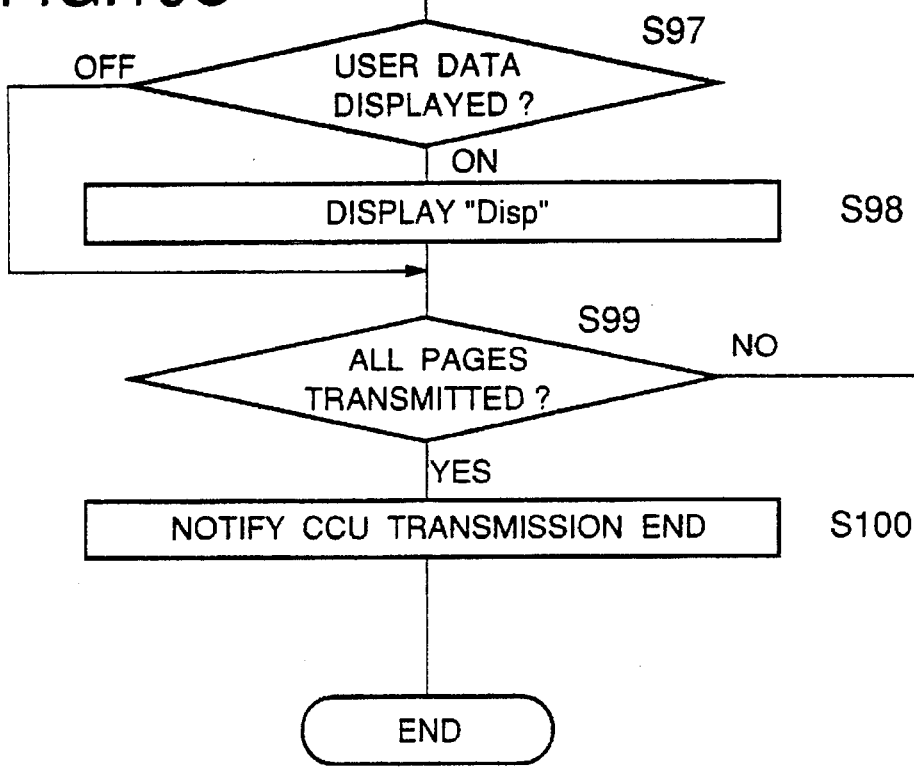

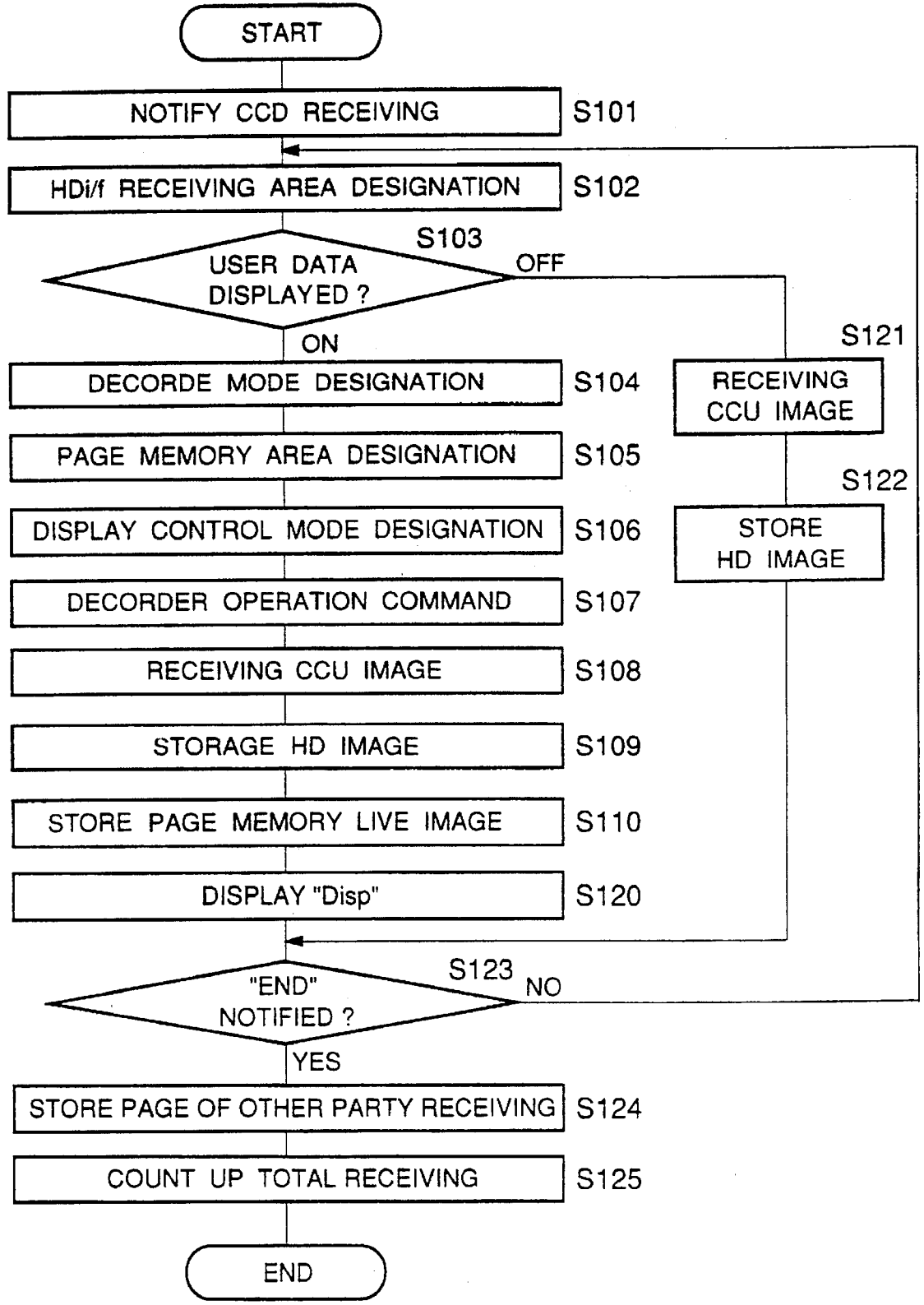

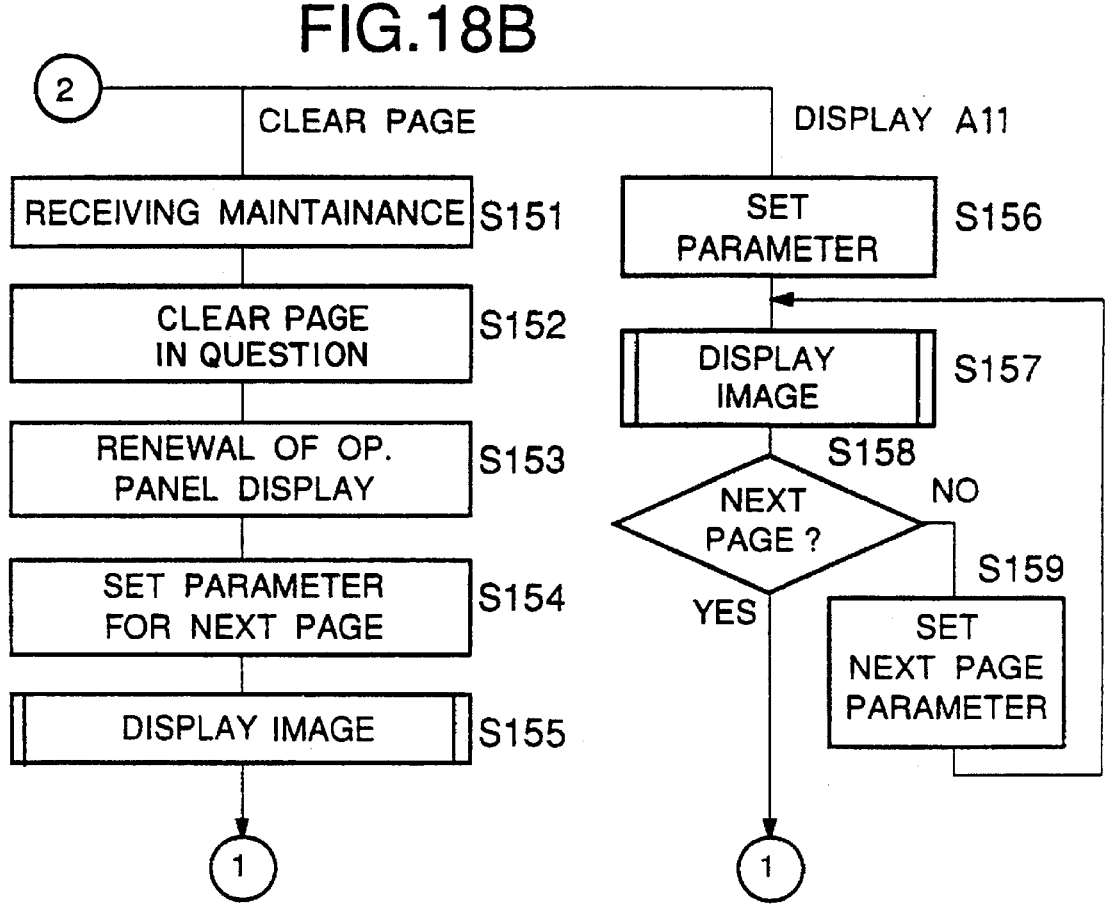
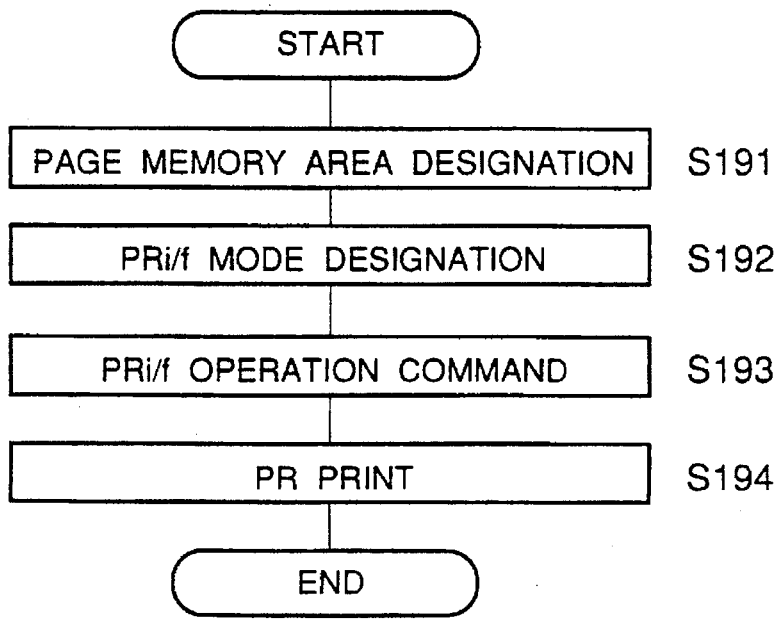

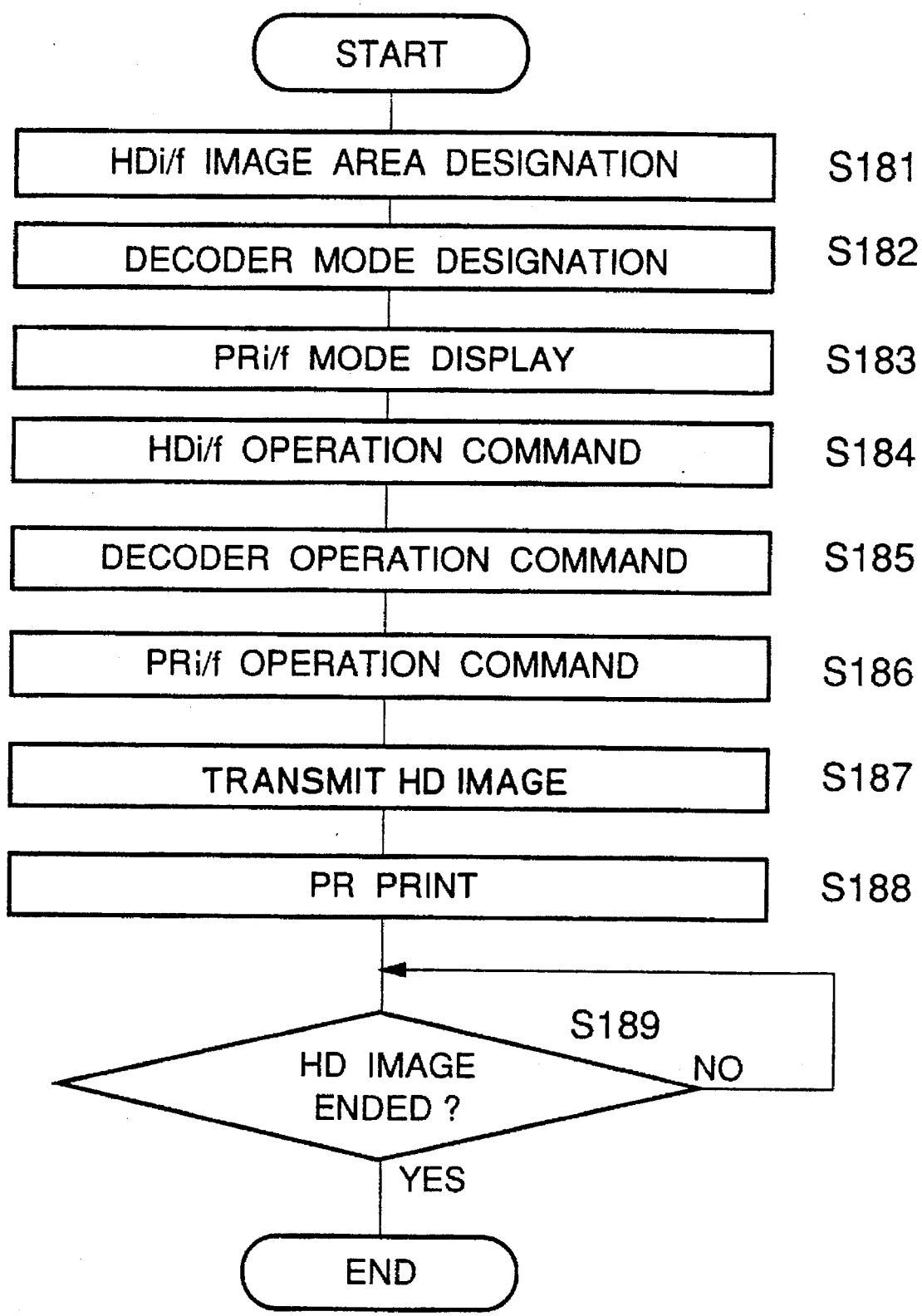

COLOR FACSIMILE APPARATUS WHICH SELECTIVELY DISPLAYS AN IMAGE INDICATED BY COMPRESSED IMAGE DATA OR FORMS AN IMAGE INDICATED BY THE COMPRESSED IMAGE DATA

This application is a division of application Ser. No. 08/255,814 filed Jun. 7, 1994, now U.S. Pat. No. 5,485,283, which was a continuation of application Ser. No. 07/758,799 filed Sep. 12, 1991, now abandoned.

BACKGROUND OF THE INVENTION

1. Field of the Invention

The present invention relates to a facsimile apparatus capable of transmitting color images and monochromatic images.

2. Related Background Art

The conventional color facsimile apparatus are so designed that the transmitted or received original image is obtained as a color hard copy on paper by a printer such as a thermal printer, an ink jet printer or an electrostatic printer.

In such conventional color facsimile apparatus, therefore, the original image is only obtained as a hard copy from such printer, so that, in order to confirm the original image read at the transmission, the image output on the printer has to be conducted and the paper is therefore wasted.

Also at the image reception, the images are all printed in the printer, including unnecessary ones, so that the paper may be wasted.

SUMMARY OF THE INVENTION

An object of the present invention is to provide a facsimile apparatus not associated with such drawbacks.

Another object of the present invention is to provide a facsimile apparatus enabling to confirm the image in advance prior to transmission or printing.

Still another object of the present invention is to provide a color facsimile apparatus capable of providing monochromatic display according to the transmission mode, even on the image data obtained by color reading.

The foregoing objects can be attained, according to a preferred embodiment of the present invention, by a color facsimile apparatus capable of transmitting color and black-and-white images and equipped with a monitor for image display, wherein, in case of transmission of a black-and-white image, predetermined components are extracted as black-and-white data from the color image signals obtained by image reading in a scanner and are displayed on the monitor, so that a black-and-white image reading need not be conducted and the configuration of the apparatus can therefore be simplified.

Still another object of the present invention is to provide a color facsimile apparatus capable of improving the quality of image displayed on the monitor.

Still another object of the present invention is to provide a color facsimile apparatus with improved convenience of use.

Still another object of the present invention is to provide a color facsimile apparatus with novel functions.

Still another object of the present invention is to provide a color facsimile apparatus capable of achieving various functions with a simple structure.

Still other objects of the present invention, and the advantages thereof, will become fully apparent from the following description of the embodiments, to be taken in conjunction with the attached drawings.

BRIEF DESCRIPTION OF THE DRAWINGS

FIG. 17 is a flow chart showing a receiving operation and a display operation of the received image in said embodiment;

FIGS. 18A and 18B are a flow chart showing an operation with the operation panel after reception in said embodiment;

FIG. 20 is a flow chart of a "print" subroutine in said embodiment; and

FIG. 21 is a flow chart of a "print page memory" subroutine in said embodiment.

DETAILED DESCRIPTION OF THE PREFERRED EMBODIMENTS

Figure 1:
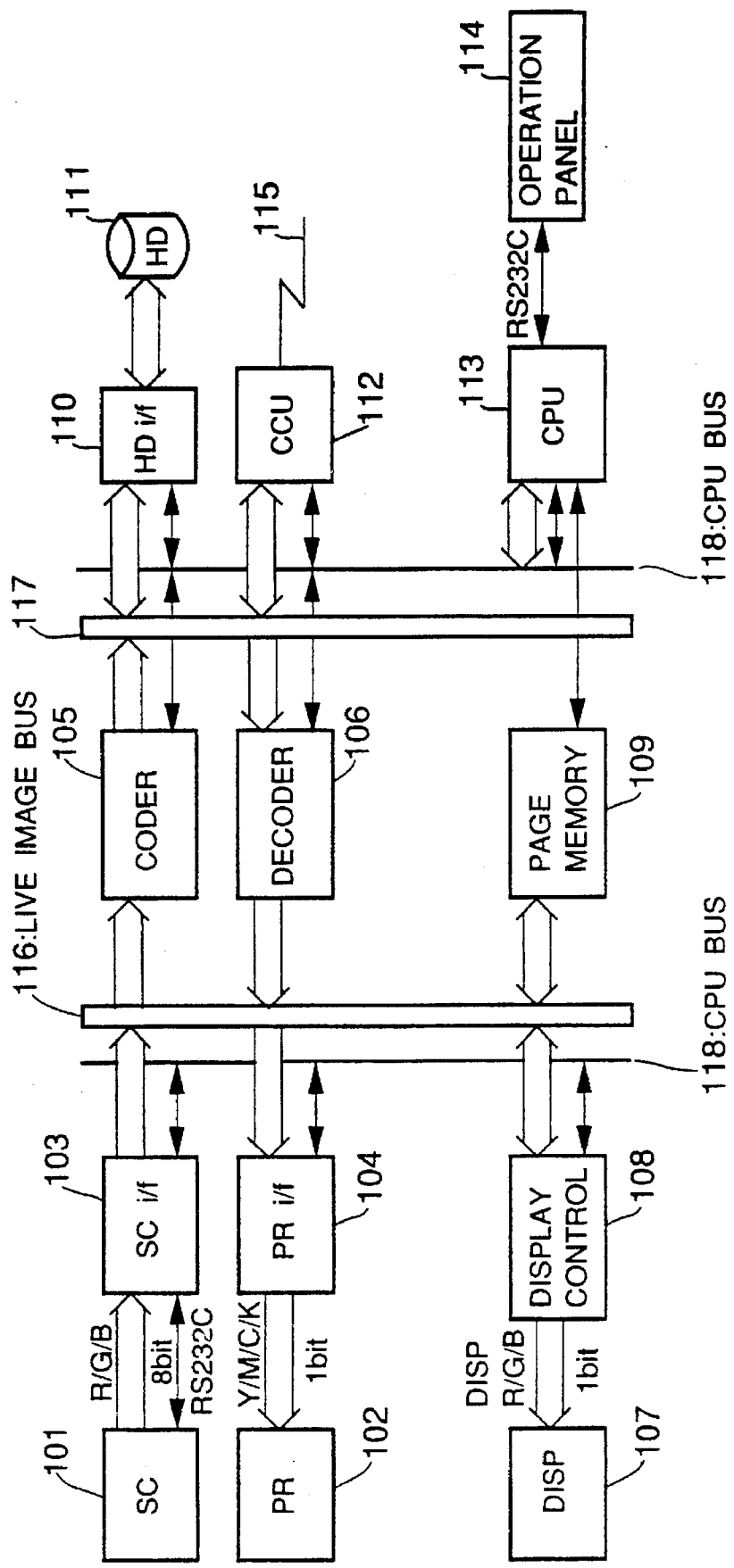
FIG. 1 is a block diagram of an embodiment of the color facsimile apparatus of the present invention.

FIG. 1 is a block diagram of a color facsimile apparatus constituting an embodiment of the present invention.

Said facsimile apparatus is so constructed as to be capable of transmitting both color and black-and-white images, and particularly of color image transmission with a reduced data amount, by generating a color image of binary continuous tone from a color image of multi-value continuous tone obtained by reading an original image.

The above-mentioned image, converted from multi-value state to binary state (called uncompressed image data in the present embodiment), is further encoded to obtain the actually transmitted data. The facsimile apparatus of the present embodiment displays the image in the state of said binary uncompressed image data on the display unit, thereby enabling visual observation of the transmitted or received image without hard copying.

In the following explained are the components of the apparatus.

A scanner 101 is capable of reading a color image, and releases an 8-bit multi-value image signal for each of red (R), green (G) and blue (B).

A printer 102, capable of printing a color image, is composed for example of an ink jet printer such as so-called bubble jet printer in which ink droplets are discharged by film boiling, a thermal printer or an electrostatic printer, and receives a 1-bit signal for each of yellow (Y), magenta (M), cyan (C) and black (Bk). In the present invention, however, there may be employed a printer receiving multi-value signals.

A scanner interface 103 effects binary digitization on the image signal from the scanner 101, and transmits control signals of a CPU 113 to the scanner 101. The details of this unit will be explained later.

A printer interface 104 converts RGB image signals from a decoder 106 into YMCK signals for supply to the printer 102, and also transmits the control signals from the CPU 113 to the printer 102.

An encoder 105 effects color compression or MMR compression, as will be explained later, on the R, G and B 1-bit image signals from the interface 103, and stores the obtained encoded image data in a rigid disk in the unit of a page.

A decoder 106 effects color decoding or MMR decoding on the encoded image data from the rigid disk 111, thereby releasing R, G and B uncompressed 1-bit image data.

A display unit 107 is provided on an operation panel 114 and displays data from a display control unit 108. In the present embodiment, said display unit 107 is composed a unit capable of plain dot display such as a cathode ray tube, a liquid crystal display panel or a plasma display panel, and is rendered capable of displaying a color image.

A display control unit 108 effects a reduction process, to be explained later, on the uncompressed image data from the decoder 106, and stores the obtained results in an internal memory, thereby generating R, G and B 1-bit signals.

A rigid disk interface 110 sends or receives encoded image data to or from an encoded image bus 117 for interfacing with the rigid disk 111, and controls the operation area and the operation mode of said rigid disk 111 according to commands from the CPU 113.

A rigid disk 111, composed of a magnetic disk or a magnetooptical disk, stores encoded image data in the unit of a page at transmission or reception.

A communication control unit (CCU) 112 controls the communication with a communication channel 115, thereby transmitting or receiving encoded image data. It also exchanges facsimile protocol data with the CPU 113 through a CPU bus 118, and effects transfer of encoded image data to or from the rigid disk 111 through an encoded image bus 117.

The communication channel 115 may be composed, for example, of ISDN, PSDN or PSTN.

A CPU 119, provided with a ROM storing programs and a RAM for storing various data, serves to control the entire apparatus. It also controls a CPU bus 118, and is connected with an operation panel 114 by an RS 232C interface.

A page memory 109 is used for storing R, G and B uncompressed 1-bit image data in the form of a bit map memory, and has a memory capacity of 2 MB×3=6 MB for A4-sized image. In the present embodiment it is composed of a DRAM, refresh controlled by the CPU 113.

An operation panel 114 is provided with a keyboard, a display unit etc. and is connected with and controlled by the CPU 113 through RS232C serial signals.

An uncompressed image bus 116 transfers the R, G and B uncompressed binary image data among various blocks.

An encoded image bus 117 transfers encoded image signals among various blocks.

A CPU bus 118 transfers the control signals among the CPU 113 and various blocks.

Figure 2:
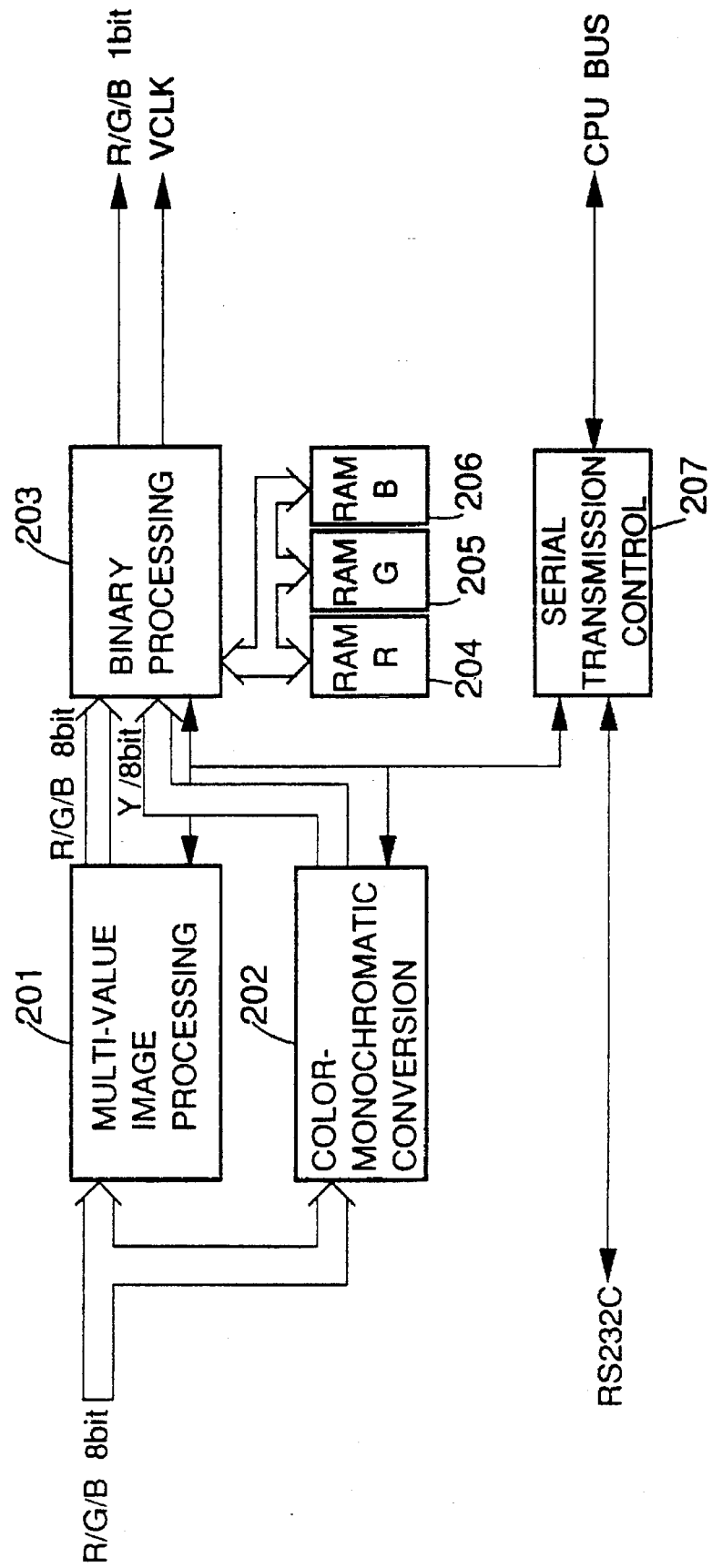
FIG. 2 is a detailed block diagram of a scanner interface in said embodiment.

FIG. 2 is a detailed block diagram of the scanner interface 103 mentioned above.

A multi-value image processing unit 201 receives R, G and B image signals of 8 bits each, and effects correction and image processing on said R, G, B signals.

A color-monochromatic conversion unit 202 generates, from said R, G, B signals, an 8-bit luminance signal Y=R (0.3)+G(0.59)+B(0.11) as black-and-white data. However the black-and-white data are not limited to such method but may be formed, for example, by fetching G component only.

A binary digitizing unit 203 receives the aforementioned R, G and B 8-bit signals or the 8-bit luminance signal Y, and generate R, G and B 1-bit signals by error diffusion method or simple binary digitizing method. Also the 8-bit Y signal is released as a 1-bit B signal serving as a common signal.

RAM's 204, 205, 206 are used as line buffers for error diffusion method in the binary digitizing unit 203.

A serial communication control unit 207 interfaces the control signals for the scanner 101 according to a format RS232C in the present embodiment, and effects data transfer with the CPU 113.

Though not illustrated, the printer interface 104 is also provided with a similar serial communication control unit for interfacing with the printer 102.

The serial communication control unit 207 also effects control of internal hardware and mode setting.

Figure 3:
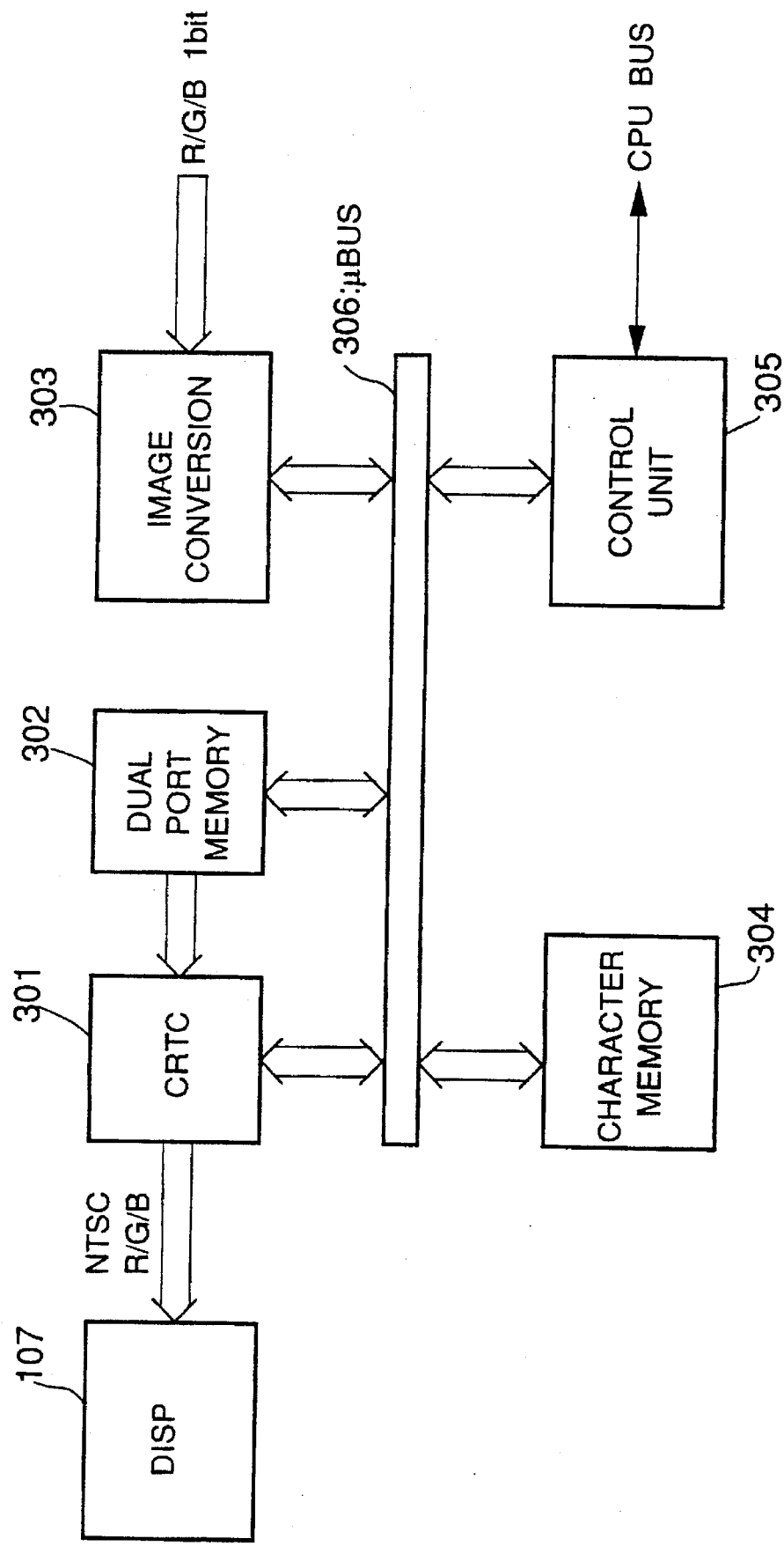
FIG. 3 is a detailed block diagram of a display control unit in said embodiment.

FIG. 3 is a detailed block diagram of the display control unit 108.

A CRT controller 301 supplies the display unit 107 with a display signal of NTSC standard. The display unit 107 may also be composed of a liquid crystal display unit or a plasma display panel, instead of a cathode ray tube (CRT).

A dual port memory 302 is a bit map memory corresponding to the display unit 107, and, in case the display unit 107 is composed of 1120 (horizontal) ×800 (vertical) pixels, has a capacity of two frames of 900 Kbit×3 colors (R, G, B)=2.7 Mbit, including bit map memories for accumulating data of R, G and B frames.

An image conversion unit 303, provided for display, processes the R, G and B uncompressed image data to match the display size according to the display mode, and transfers the entered uncompressed R, G, B image data, as a part of the display data, to the dual port memory 302 through a μ-bus 306. In case of monochromatic display mode, the image conversion unit 303 stores, among the entered R, G, B image data, the G component in the R, G, B bit map memories of the dual port memory 302, thereby effecting the monochromatic display. Also in case of said monochromatic mode, if the entered image data are monochromatic data, for example MMR encoded data, said data are stored in the R, G, B bit map memories of the dual port memory 302. The above-mentioned operations are automatically selected by a parameter set in the image conversion unit 303.

A character memory 304 temporarily stores character data for display, given from a control unit 305, and transfer said data, as a part of display data, to the dual port memory 302 through the μ-bus 306.

A control unit 305 effects control on said CRT 301 and on the image conversion unit 303, transfer of display data among the dual port memory 302, image conversion unit 303 and character memory 304, and control on display data transfer between the CRT controller 301 and the dual port memory 302. It also control various units according to the commands from the CPU 113 and stores the character data for display in the character memory 304.

Also the control unit 305 realizes an initial state without image display, by writing "0" in the R, G, B bit map memories of the dual port memory 302 and writing only the data from the character memory 304 into the dual port memory 302.

Furthermore, the control unit 305 controls the color selection of character display by writing the data from the character memory 304 into desired ones of the R, G, B bit map memories of the dual port memory 302. The control unit 305 is equipped with a memory storing character patterns corresponding to alphabets, numerals, kana characters, Chinese characters and other symbols.

Figure 6:
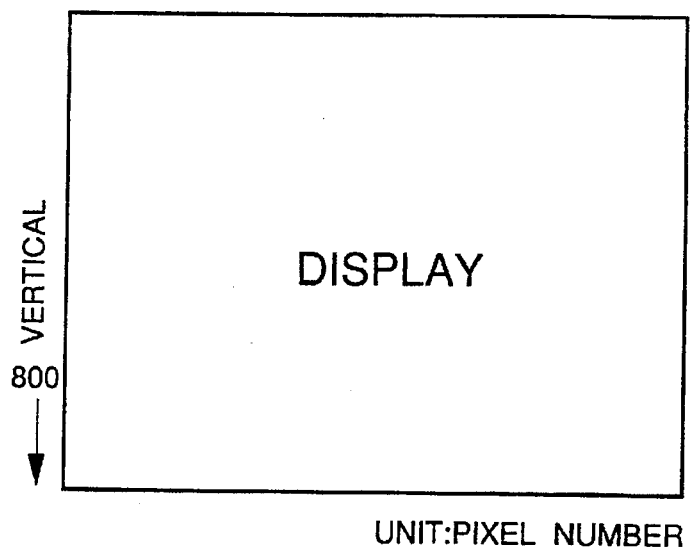
FIG. 6 is a schematic view showing a displayed image on a display unit in said embodiment.

FIG. 6 schematically illustrates the displayed image frame of the present embodiment.

Figure 7:
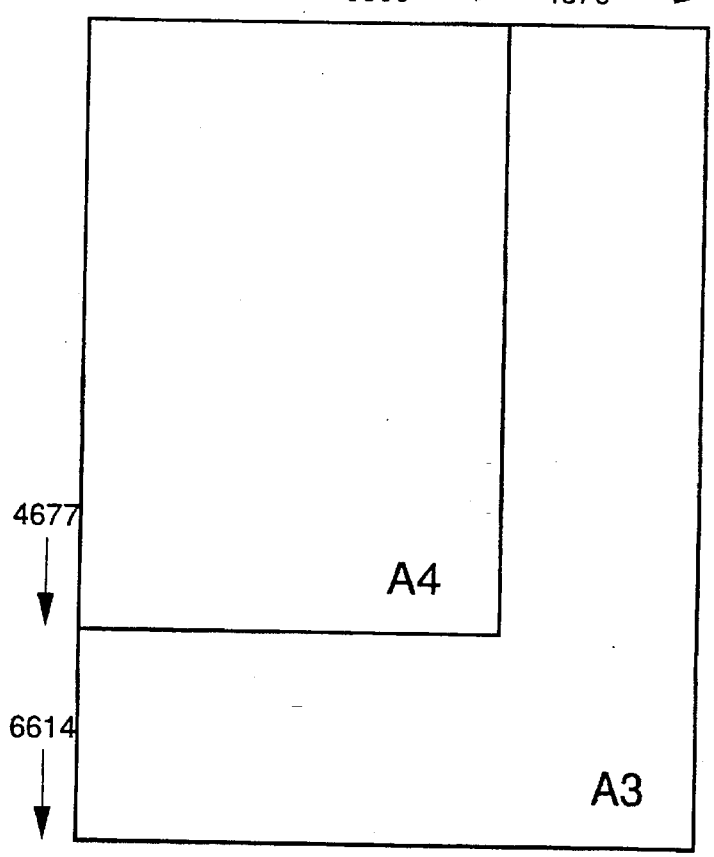
FIG. 7 is a schematic view showing images of A4 and A3 sizes displayed on the display unit in said embodiment.

In the present embodiment, an A4- or A3-sized image as shown in FIG. 7 can be displayed on the display unit 107 in a horizontal display state (horizontally oblong state) or in a vertical display state (vertically oblong state), with suitable image size reduction.

The image reduction rates are as follows.

| Horizontally oblong display state: | |
|---|---|
| A4 (400 × 400 dpi) | 24% |
| A4 (200 × 200 dpi) | 48% |
| A3 (400 × 400 dpi) | 17% |
| A3 (200 × 200 dpi) | 34% |
| Vertically oblong display state: | |
| A4 (400 × 400 dpi) | 34% |
| A4 (200 × 200 dpi) | 67% |
| A3 (400 × 400 dpi) | 24% |
| A3 (200 × 200 dpi) | 48%. |

Also in case of other sheets sizes such as B4 or B5, or in case the reduction rate varies according to the number of pixels, the control unit 305 effects image reduction by giving an instruction to the image conversion unit 303 according to the desired reduction rate.

Figure 10:
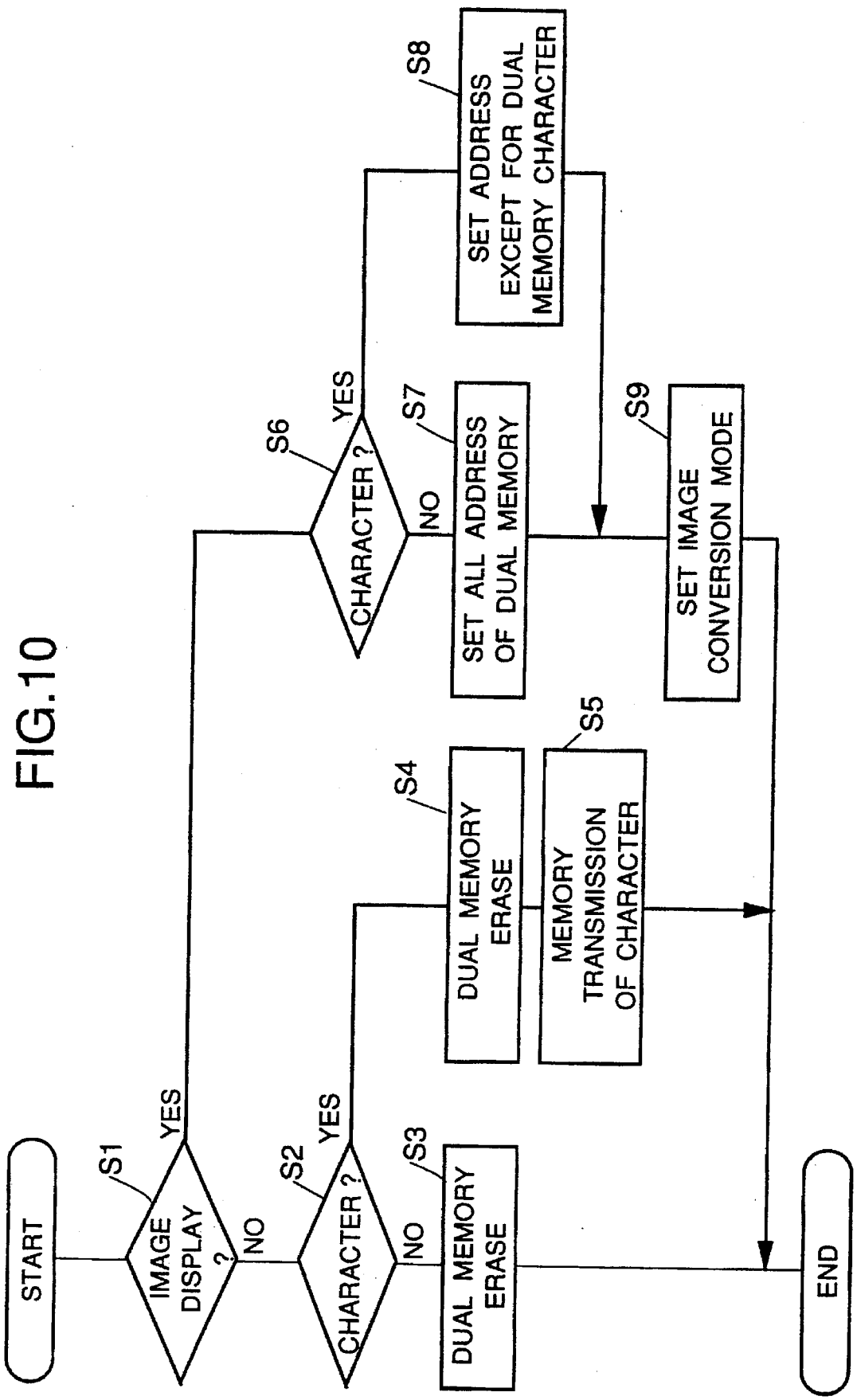
FIG. 10 is a flow chart showing the control sequence in display mode setting in said embodiment.

FIG. 10 is a flow chart showing the operations at display mode setting.

At first, according to a mode instruction from the CPU 113, the control unit 305 discriminates whether an image display is selected (S1), and, if not, it discriminates whether a character display is present (S2). If the character display is absent, the content of the dual port memory 302 is erased (S3). If it is present, the content of the dual port memory 302 is erased and the data of the character memory 304 are transferred to the dual port memory 302 (S5).

On the other hand, if the step S1 identifies that the image display is selected, there is discriminated whether a character display is present (S6), and, if absent, an address counter of the control unit 305 is so set as to enter data of a frame into the dual port memory 302 (S7). In case the character display is present, the address counter is so set as to enter the image data into the dual port memory 302, excluding a portion for the character display (S8).

Then the mode is set in the image conversion unit 303 (S9) and the sequence is terminated.

Figure 11:
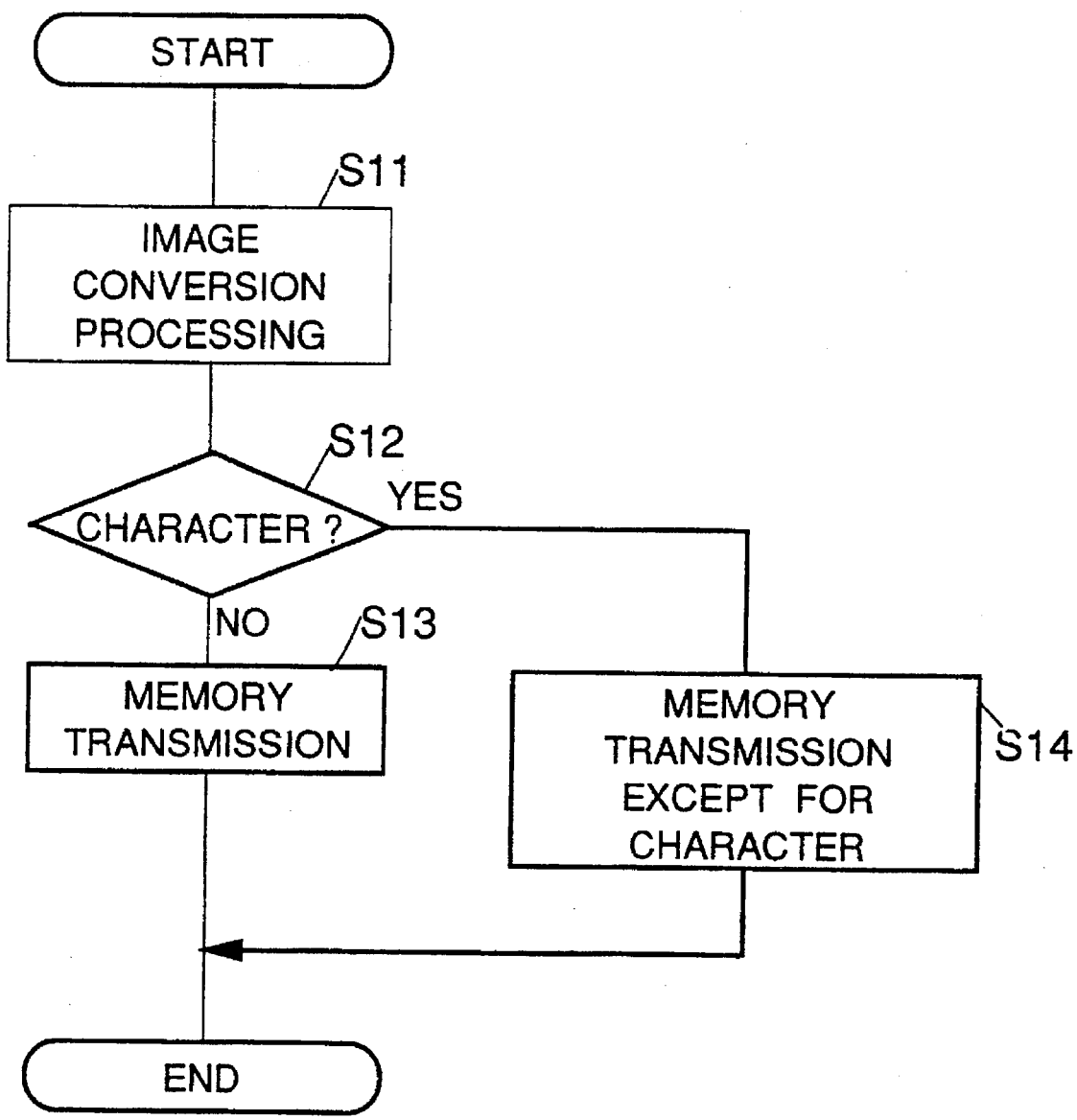
FIG. 11 is a flow chart of a display operation in said embodiment.

FIG. 11 is a flow chart of display operation, for entering uncompressed image data from the uncompressed image bus 116 and displaying said data.

The image conversion unit 303 receives uncompressed image data and effects image conversion with a predetermined mode (S11), and, in the absence of character display (S12), the data of a frame are transferred to the dual port memory 302 (S13). In case the character display is present (S12), the data of a frame excluding the character display area are transferred to the dual port memory 302 (S14).

Figure 4:
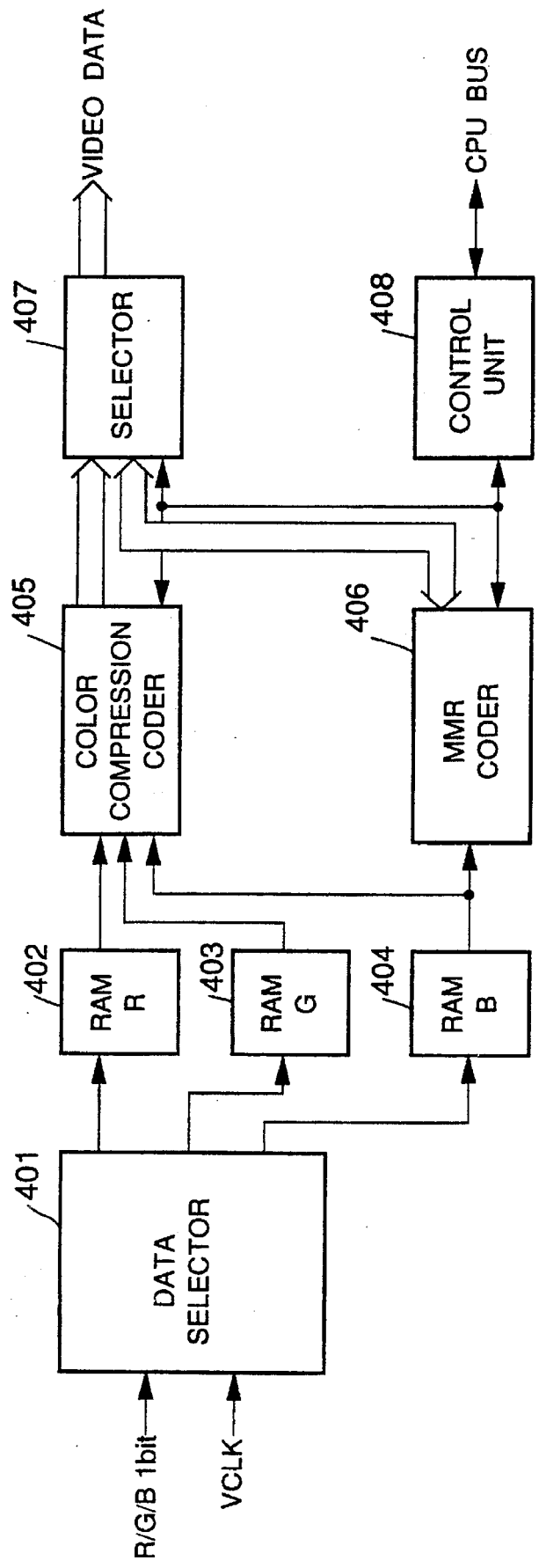
FIG. 4 is a detailed block diagram of an encoder unit in said embodiment.

FIG. 4 is a block diagram of the encoder 105.

A selector 401 distributes the input image. signals R, G and B.

RAM's 402, 403, 404 are buffer memories for respectively storing said R, G and B image signals by several main scanning lines, and are used for matching the rate of image data input to the encoder 105 and the output rate therefrom.

A color compression encoder 405 effects compression encoding of 3-bit R, G, B signals. In the present embodiment, a highly efficient compression is achieved for example by arithmetically predicted encoding.

An encoder 406 is composed, in the present embodiment, of an MMR encoder matching the G4 standard, with ability to communicate with existing facsimile apparatus. MH or MR encoding of G3 protocol is also possible.

A selector 407 serves to select thus encoded video data, and transfers the encoded data, in the unit of a frame, to the rigid disk 111 through the encoded image bus 117 shown in FIG. 1.

A control unit 408 sets the modes for the color compression encoder 405, MMR encoder 406 and selector 407 according to the instruction from the CPU 113, whereupon each encoder effects operation in the encoding mode or in the non-compression (through) mode, according to the selected sheet size and resolving power.

The color compression encoder 405 of the present embodiment is also provided with a mode of compression encoding, utilizing either one of the R, G, B 3-bit signals.

Also the color compression encoder 405 and the MMR encoder 406 are both capable of conversion of resolving power and of sheet size, according to the selected mode, in the following manner:

Conversion of resolving power:
  1) 400×400→200×200 dpi
  2) 200×200→400×400 dpi Conversion of sheet size:
  1) A4 to A3
  2) B4 to B5
  3) B5 to B4.

Figure 5:
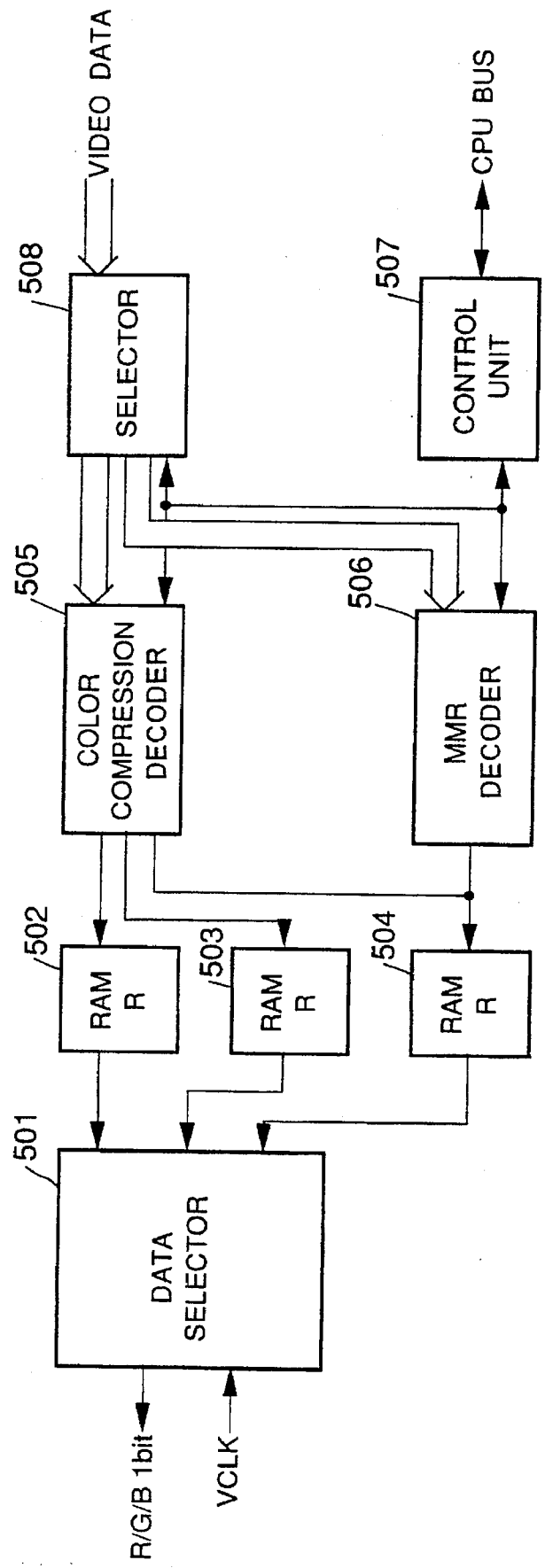
FIG. 5 is a detailed block diagram of a decoder unit in said embodiment.

FIG. 5 is a detailed block diagram of the aforementioned decoder 106.

A data selector 501 converts the decoded uncompressed image data into R, G and B 1-bit serial data.

RAM's 502, 503, 504 are buffer memories for storing decoded R, G and B uncompressed data by several main scanning lines, and are used for rate matching as in the RAM's 404-406 in FIG. 4.

A color compression decoder 505 is used for decoding the codes, encoded in the color compression encoder 405.

A decoder 506 is an MMR decoder matching the G4 standard, capable of communication with the existing facsimile apparatus, and is also capable of MR or MH decoded according to the G3 standard.

A control unit 507 sets the mode for the color decoder 505 and the MMR decoder 506 according to the instruction of the CPU 113, and sets the operation for each size and resolving power, according to the encoding mode or the non-compression (through) mode.

A selector 508 enters the encoded data from the rigid disk 111 through the encoded image bus 117, effects buffering, and provides the encoders 505, 506 with encoded data according to the encoding method of the data.

Figure 8:
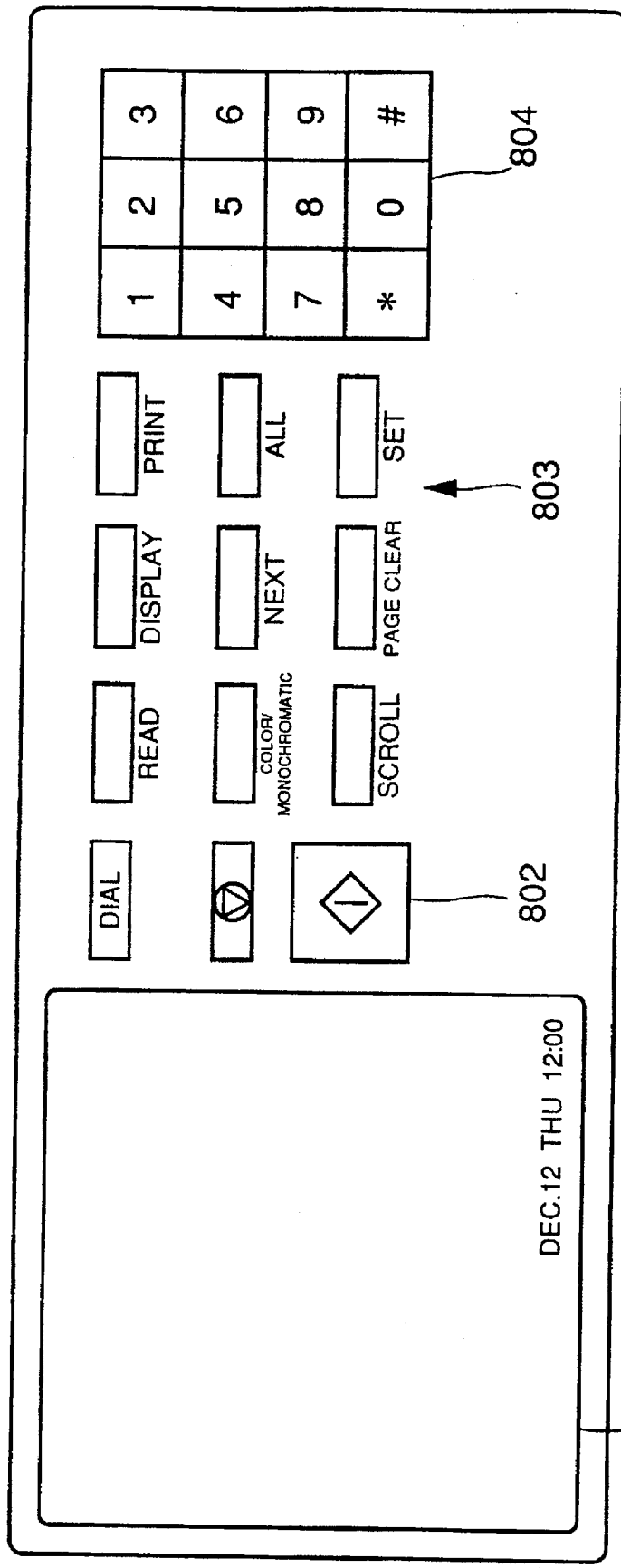
FIG. 8 is a plan view of an operation panel in said embodiment.

FIG. 8 is an external plan view of an operation panel 114.

A display unit 107 is composed of a liquid crystal display (LCD), capable of displaying image and characters, receiving character display commands from the CPU 113 and controlled by an unrepresented internal CPU.

A key column 802 includes dialling, start and stop keys. Key columns 803 includes keys relating to transmission, reception, display and print. Key columns 804 includes numeral keys. Actuations of these keys are identified by an unrepresented internal CPU, and the depression of each key is informed to the CPU 113.

Figure 12:
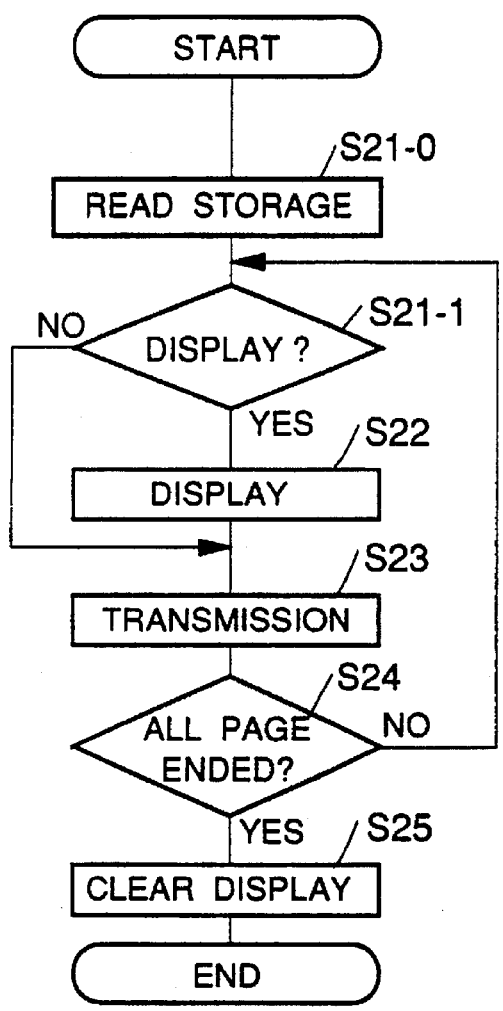
FIG. 12 is a flow chart showing the outline of original reading, display, transmission and display clearing at the transmission in said embodiment.

FIG. 12 is a flow chart showing the outline of original reading, display, transmission and display clear in the transmitting operation.

Figure 9:
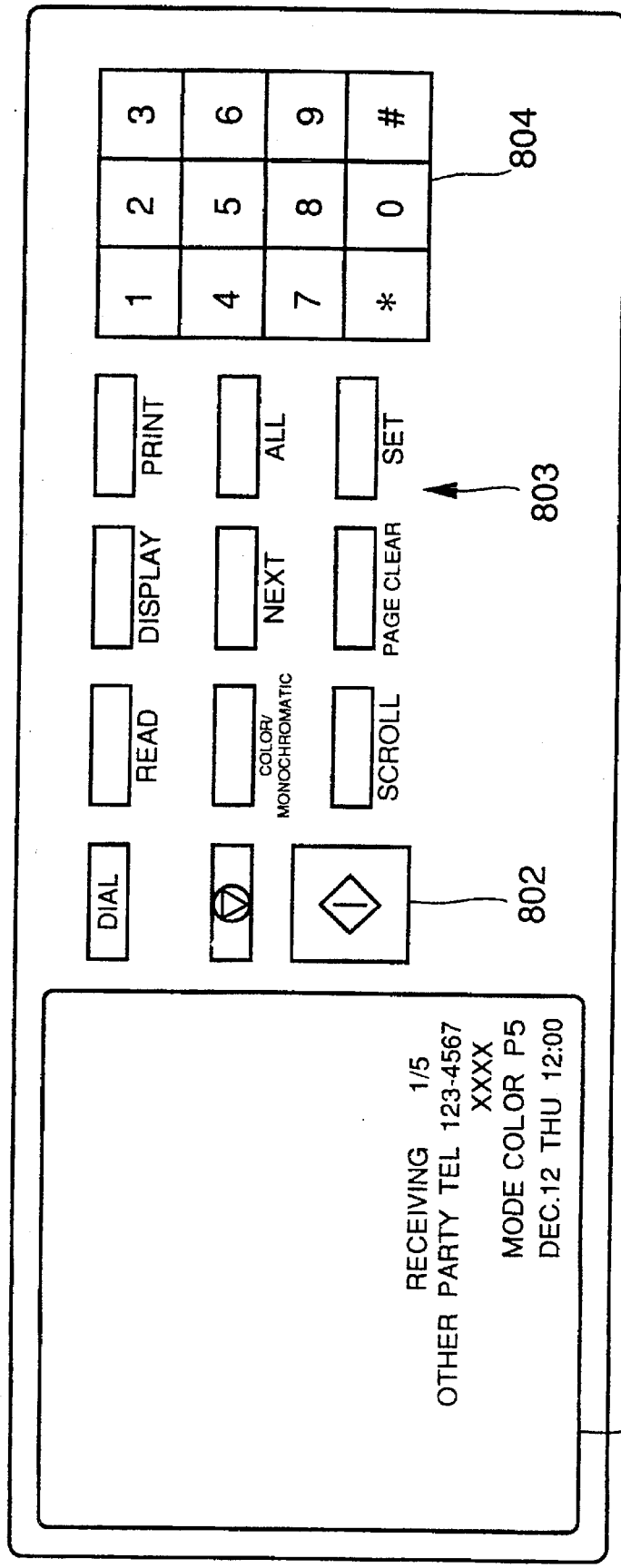
FIG. 9 is a plan view showing an example of display in a display unit in said operation panel.

At first an original is read by the scanner 101, and the obtained signal is subjected to image processing and encoding. Then the signal of all the pages is stored in the rigid disk (S21-0). In case the display key shown in FIG. 9 is actuated by the operator, the sequence branches from a step S21-1 to S22 for displaying the first page on the display unit 107 (S22), and transmission is conducted by the CPU 112 (S23). These operations are repeated until all the pages of the original, read in the step S21, are transmitted (S24). On the other hand, if the display key is not actuated, the sequence branches from the step S21-1 to S23, and, when all the pages are transmitted, the display control unit 108 clears the image on the display unit 107 to black (S25).

Figure 13:
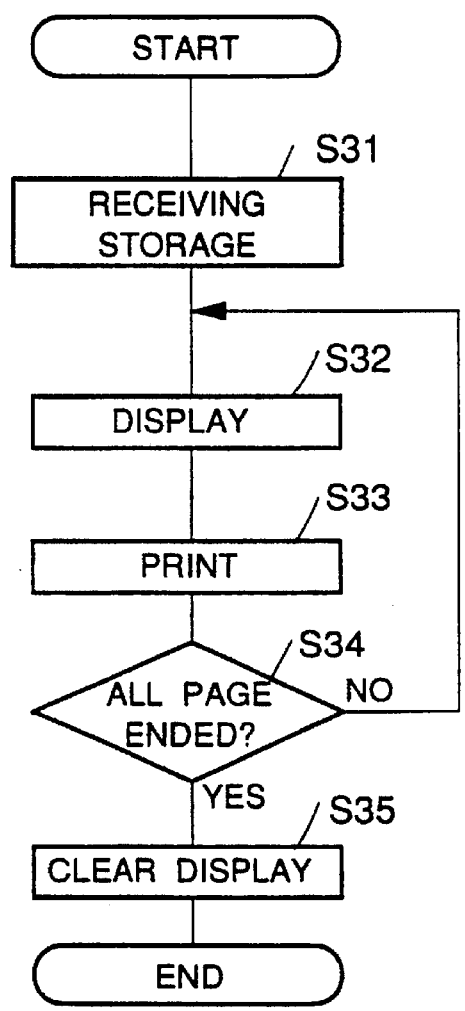
FIG. 13 is a flow chart showing the outline of reception, storage, display, printing and display clearing at the reception in said embodiment.

FIG. 13 is a flow chart showing the outline of received data storage, display, print and display clearing at the receiving operation.

At first, all the pages of images received by the CCU 112 are stored in the rigid disk 111 (S31), and, if necessary, the image is printed by the printer 102 (S33). This operation is repeated until all the received pages are printed (S34). Thereafter the display control unit 108 clears the image of the display unit 107 to black (S35).

Figure 14:
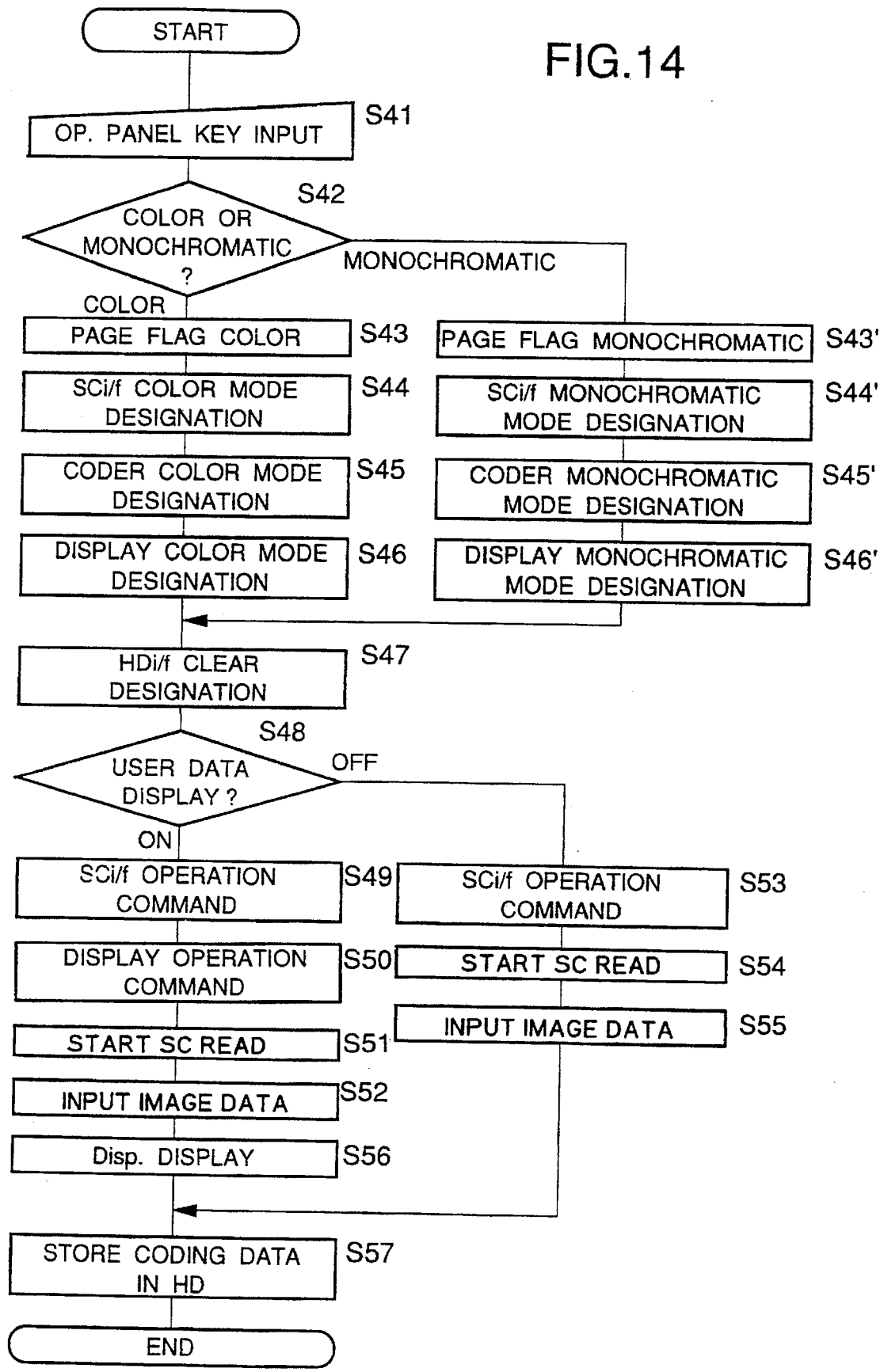
FIG. 14 is a flow chart showing the outline of original reading, encoded data storage and image display in said embodiment.

FIG. 14 is a flow chart showing the outline of original reading, encoded data storage and image display.

At first, when the reading key on the operation panel 114 is depressed, the CPU 113 discriminates the state of a color/monochrome key, and sets a page flag according to the color mode or the black-and-white mode selected (S43, S43'). It then instructs the modes for the scanner interface 103, encoder 105 and display control unit 118 (S44–S46', S44'–S46'), and gives an instruction to the rigid disk interface 110 for securing a storage area in the rigid disk 111 (S47).

Then a user data area (not shown) in the CPU 113 is referred to, and the subsequent operations are switched according to a flag indicating the state of display for the read image (S48). In case the display is on, start commands are given to the scanner interface 101 and the display control unit 108, whereby the scanner 101 starts reading operation and the display unit 107 displays the read data (S49–S52, S56). In case the display is off, a start command is given to the scanner interface 101 to start the image reading operation thereof, whereby the read data are entered (S53–S55).

The read data are encoded by the encoder 106, and stored in the unit of a page in the rigid disk 111 through the rigid disk interface 110. At the same time, according to the setting of the color/monochrome key, a color flag or a monochrome flag is stored in the rigid disk, together with the encoded data. The encoder 105 effects encoding with the mode designated in the step S45 (S57).

Figure 15:
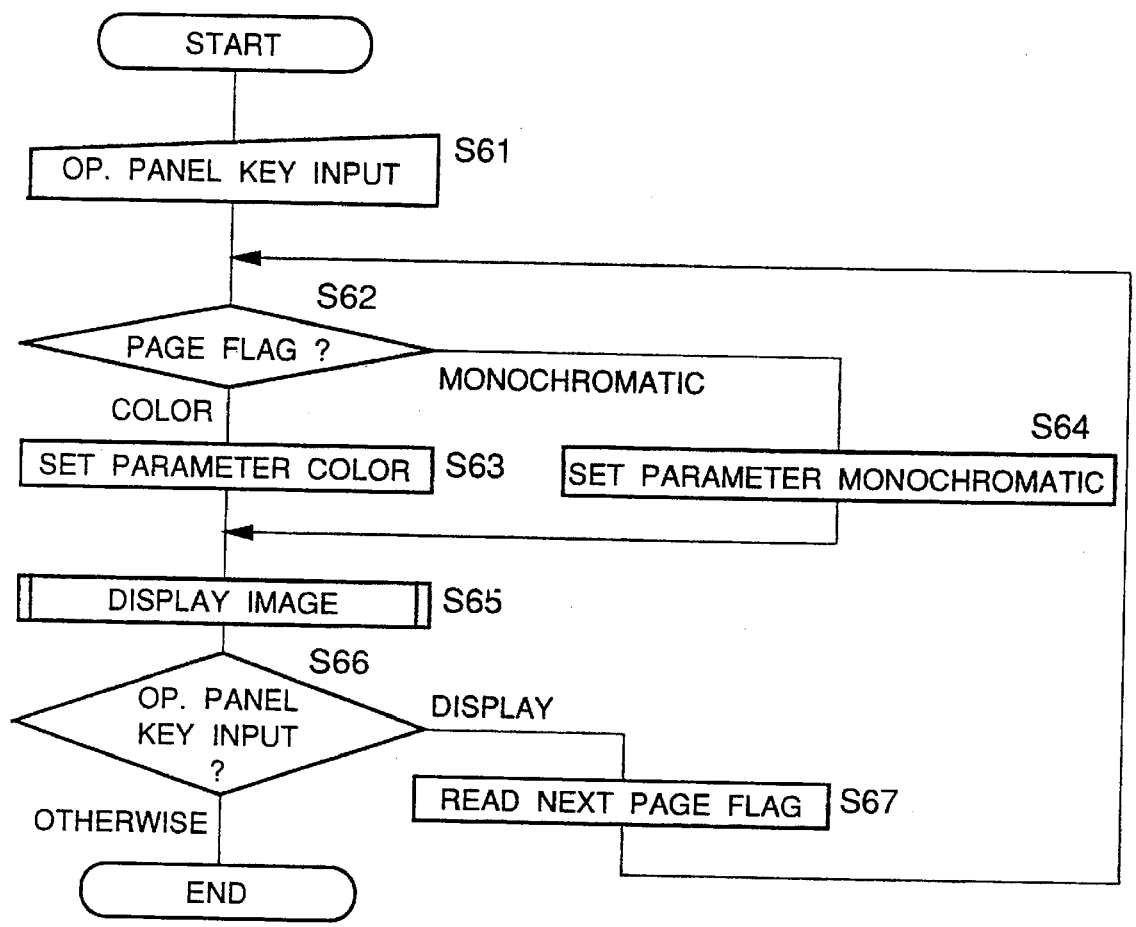
FIG. 15 is a flow chart showing an operation of displaying an image stored in a rigid disk and transmitting said image in said embodiment.

FIG. 15 is a flow chart showing the operation of displaying the image, stored in the rigid disk 111, on the display unit 107, and transmitting said image.

When the display key on the operation panel 114 is actuated (S61), the CPU 113 sets a parameters in the image conversion unit 303, shown in FIG. 3, according to the page flag, indicating whether the image in the rigid disk 111 is color or monochrome image, and effects image display by calling an "image display" subroutine to be explained later (S62–S65).

Then, in case the "Next" key on the operation panel 114 is actuated (S66), the CPU 113 refers to a page flag, indicating whether a next image is stored, and a page address, indicating the storage address of the next image (S67), and the sequence returns to the step S62 to display the next page.

Figure 16B:
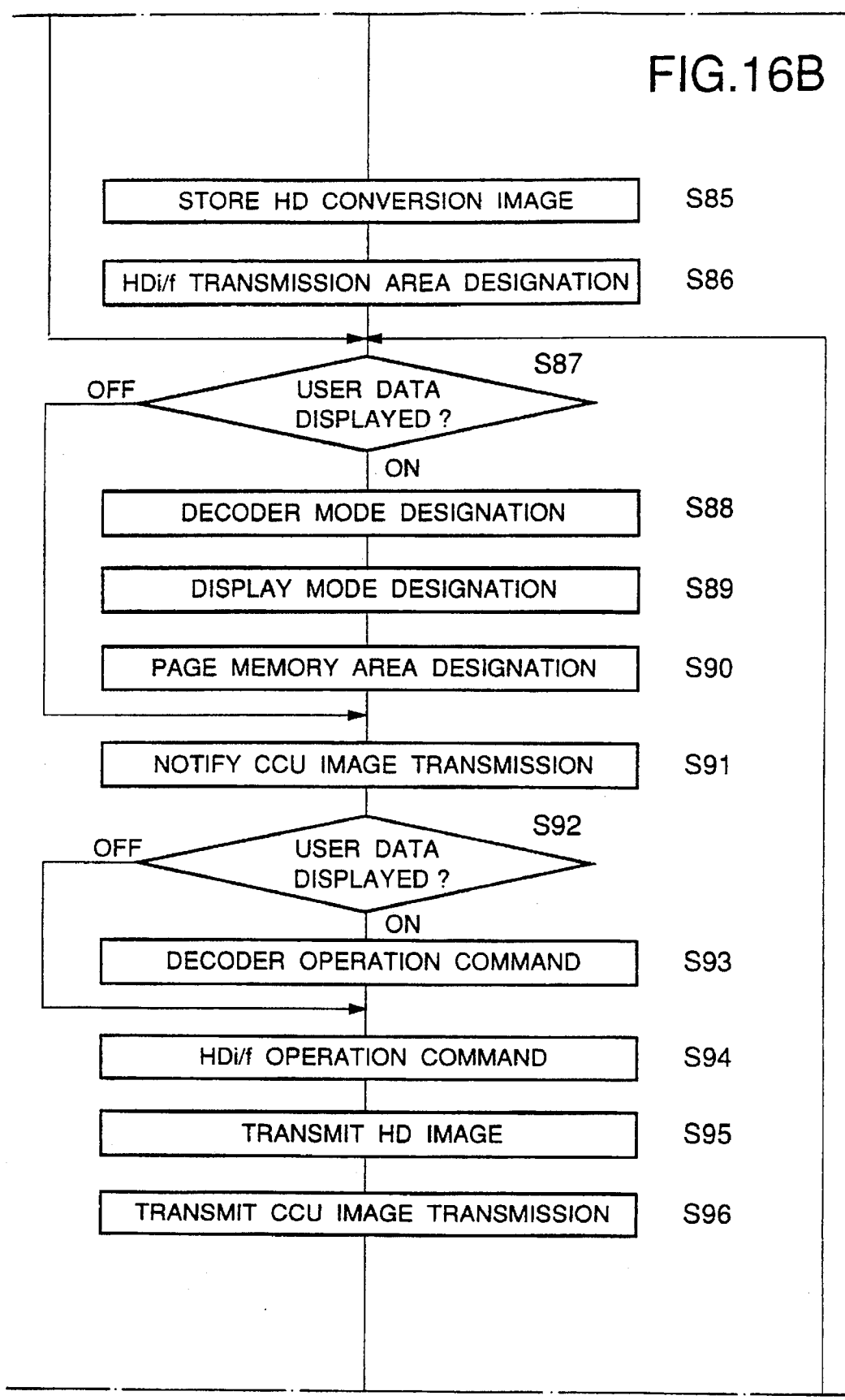
FIG. 16 is a flow chart showing a transmitting operation and a display operation in said embodiment.

FIG. 16 is a flow chart showing the operations of transmission and display.

When an original image is stored in the rigid disk 111 and the operator actuates the dialling key and the numeral keys to enter a number, the CPU 113 sends an area designation for the rigid disk 111 to the rigid disk interface 110, prepares for the image data readout, and sends a communication preparation command to the CCU 112 (S71, S72). The CCU 112 starts communication with the destination and receives the functions of the destination (S73).

The CPU 113 compares the image processable by the functions of the destination with the already stored image (S74), and, if the kinds of both images are different, instructs conversion modes to the encoder 105 and the decoder 106 for effecting image conversion and instructs the rigid disk interface 110 to read the image data from an area of the rigid disk 111 in which the image to be converted is stored (S75–S77, S81). Then it release commands for these operations (S82, S83).

Then the decoder 106 generates an uncompressed image, then the encoder 105 effects encoding with image conversion, and the converted image is again stored in the rigid disk 111 (S84–S85).

In case the step S78 identifies that the operator has selected the display, the CPU 113 instructs the display mode to the display control unit 108 and designates an area to the page memory 109, thereby displaying the image in conversion on the display unit 107 (S79–S80).

Then, at the start of transmission, there is discriminated, from the state of the display flag, whether the display key shown in FIG. 9 has been turned on (S87), and, if the display mode is selected, the display mode is instructed to the decoder 106 and the display control unit 108 (S88, S89). Also an area designation is given the page memory 109 as a preparation for display (S90).

Then the CCU 112 sends a notice of start of image transmission to the destination (S91).

The CPU 113 sends an operation command to the decoder 106 in response to the display flag (S93), sends an operation command to the rigid disk interface 110 (S94), thereby transferring the stored image from the rigid disk 111 to the CCU 112, and causes the CCU 112 to transmit the image (S95, S96). If the display flag is turned on by the operator, the image is displayed on the display unit 107 (S97, S98).

Then there is discriminated whether all the pages of the images stored in the rigid disk 111 have been transmitted (S99), and the sequence from the step S87 is repeated until the transmission is completed. When all the pages have been transmitted, the CCU 112 sends a notice of end of transmission to the destination (S100), and the transmitting operation is terminated.

FIG. 17 is a flow chart showing the operations of reception and received image display.

At first, when a call is received from the communication channel 115, the CCU 112 sends a notice for call reception to the CPU 113 (S101).

The CPU 113 instructs the rigid disk interface 110 to secure an area in the rigid disk 111 for storing the received data (S102), then refers to the display flag (S103), and, if the display is on, sends an operation command to the decoder 106 (S104–S107). It then transfers the image received by the CCU 112 to the decoder 106 (S108) and also stores the received encoded image in the reception area of the rigid disk 111 (S109). The decoder 106 stores the uncompressed image in the page memory 114, thereby displaying the image on the display unit 107 (S120).

If the step S103 identifies that the display is off, the image received by the CCU 112 is transferred to the rigid disk interface 110 and stored in the rigid disk 111 (S121, S122).

Then there is discriminated whether a reception end notice has been received (S123), and the sequence starting from the step S102 is repeated until said notice is received.

When the reception is terminated, the identification number of destination, number of pages, communication mode and total number of receptions, received from the destination, are stored in a reception data area in the rigid disk 111 (S124, S125), and the receiving operation is terminated.

Figure 18A:
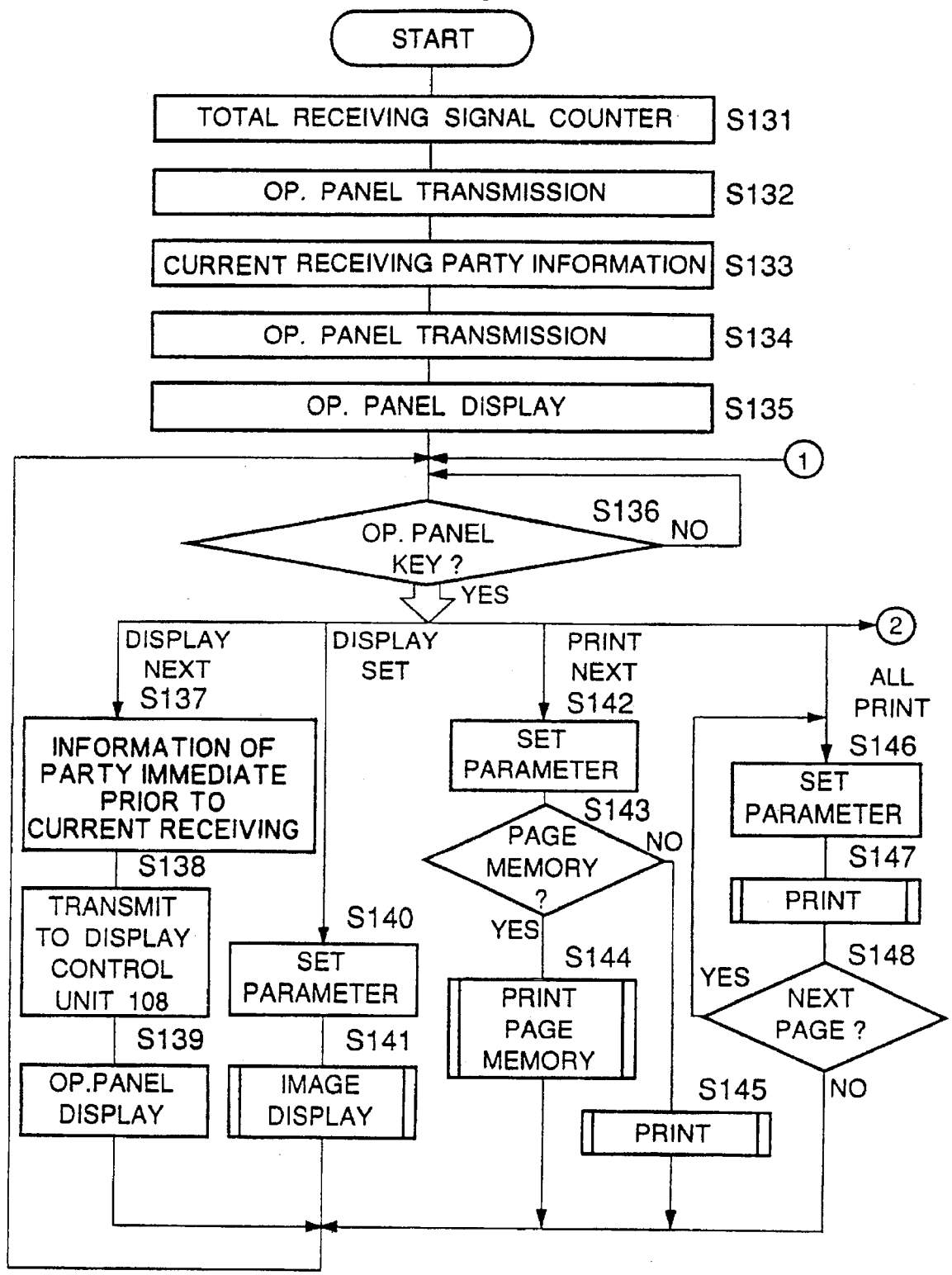

FIG. 18 is a flow chart showing operations after the reception, including panel displays at or after the reception, image display, print out etc.

At the end of receiving operation, the CPU 113 obtains the number of received communications from a total reception counter in a reception control table (S131), and sends a display command to the control unit 305 in FIG. 3 and the operation panel 114, in order to display characters corresponding to said data (S132). Also the CPU 113 reads, from the received data area of the rigid disk 111, the identification number of destination, abbreviation thereof, number of pages and communication mode of the most recently received communication (S133), and sends a display command to the operation panel 114 and the control unit 305 in order to display these data in characters (S134), whereupon the operation panel 114 displays these information (S135). The display unit 107 in FIG. 9 illustrates an example of such display.

Then respective operations are conducted in response to key actuations on the operation panel 114 (S136).

In case the display key and the "Next" key are actuated, the CPU 113 obtained, from the aforementioned received data area, the number of destination, abbreviation thereof, number of pages, communication mode etc. of a reception immediately preceding the one displayed before, and sends these data to the display control unit 108 for display on the operation panel 114 (S137–S139).

In case the display key and the set key are actuated, in order to display an image of which data are displayed on the operation panel 114 as shown by 107 in FIG. 9, the CPU 113 sets the parameters such as the received image area of the rigid disk and the image mode (S140), and calls the "image display" subroutine (S141), thereby displaying the image on the display unit 107.

Then, in response to the actuation of the "set" key of the operation panel 114, the sequence repeats the steps S136 to S140 for displaying the next page.

In case the print key and the "next" key are actuated, in order to print a page corresponding to the reception displayed on the operation panel 114, the CPU 113 sets mode parameters for the image area of the rigid disk 111, the decoder 106 and the printer interface 104 (S142), then discriminates whether the page memory 109 contains an uncompressed image same as that to be printed (S143), and, if said image is present, calls the "print page memory" subroutine (S144). If said uncompressed image is absent, the CPU 113 calls the "print" subroutine to be explained later, in order to obtain data from the rigid disk 111 (S145).

In this manner the print out in the unit of a page is conducted.

In case the print key and the "all" key are actuated, in order to print all the pages of the image corresponding to the data displayed on the operation panel 114, the CPU 113 sets mode parameters for the image area of the rigid disk 111, the decoder 106 and the printer interface 104, the CPU 113 calls the "print" subroutine (S146, S147), and the operations are repeated until all the pages of said reception are printed (S148).

In case the "page clear" key is actuated, in order to clear the page corresponding to the data displayed on the operation panel 114, the CPU 113 deletes said page from the reception control table (S151, S152), then steps up the displayed page number, and sends revised page number to the display control unit 305 for renewing the page display on the operation panel 114 (S153).

Then, in order to display the image of the next page on the display unit 107, the CPU 113 sets the mode parameters for the image area of the rigid disk 111, the decoder 106 and the display control unit 108, and calls the "image display" subroutine (S154, S155).

In case the display key and the "all" key are actuated, in order to display the image corresponding to the data displayed on the operation panel 114, the CPU 113 sets mode parameters for the area of the rigid disk 111, the image mode etc. (S156), and calls the "image display" subroutine (S157).

Then there is discriminated whether the display of all the pages of the received data has been completed (S158), then, if not, parameters for the next page are set (S159) and the sequence returns to the step S157. Such display of all the pages may be conducted by renewing the page display at a predetermined interval, or by renewing the display at each manual instruction.

Figure 19:
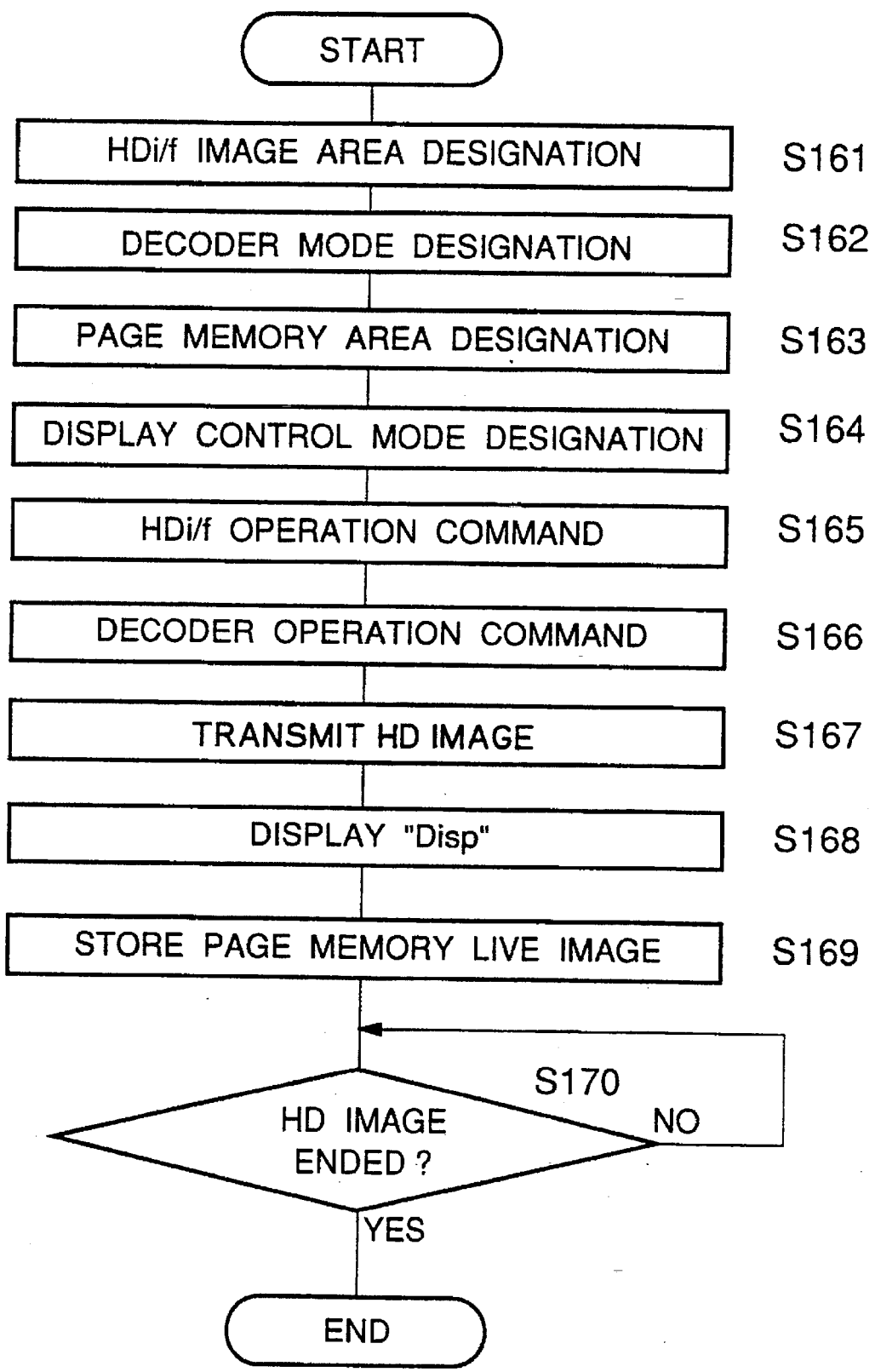
FIG. 19 is a flow chart of an "image display" subroutine in said embodiment.

FIG. 19 is a flow chart of the "image display" subroutine to be called in the foregoing flow charts.

When this subroutine is called, the image area of the rigid disk interface 110, and the operation modes of the decoder 106 and of the display control unit 108 are set by parameters, and the functions of various units are determined by said parameters.

At first mode instructions are given to the rigid disk interface 110, the decoder 106, the page memory 109 and the display control unit 108 (S161–S164), and operation commands are sent to the rigid disk interface 110 and the decoder 106 (S165–S166).

Then the image is transferred from the designated area of the rigid disk 111 to the decoder 106, and the uncompressed image, obtained by decoding in the decoder 106 according to a predetermined mode, is supplied from the display control unit 108 to the display unit 107 for display therein (S167, S168). Said uncompressed image is stored also in the page memory 114. The CPU 113 terminates the sequence when a page is processed (S169, S170).

FIG. 20 is a flow chart of the "print" subroutine to be called in the foregoing flow charts. When it is called, the instruction of image area in the rigid disk 111 to the rigid disk interface 110, the operation mode of the decoder 106 and the instruction of operation mode of the printer 102 to the printer interface 104 are set by parameters, and the various units function according to said parameters.

At first according to the set parameters, mode instructions are released for the rigid disk interface 110, decoder 106 and printer interface 104 (S181–S183). Then operation commands are sent to the rigid disk interface 110, decoder 106 and printer interface 104 (S184–S186). Thus the image is transferred from the rigid disk 111 to the decoder 106, then decoded therein according to a predetermined mode, and the obtained uncopressed image is supplied through the printer interface 104 to the printer 102 for image print out.

The CPU 113 terminates the sequence after completion of a page (S187–S189).

FIG. 21 is a flow chart of the "print page memory" subroutine to be called in the foregoing flow charts. When it is called, a parameter is set in the printer interface 104 for designating the operation mode of the printer 102, and the printer 102 functions according to said parameter.

At first an area designation and a reading mode are set in the page memory 109 (S191), then a mode parameter is given to the printer interface (S192), and an operation command is sent to the printer interface 104, whereupon the uncompressed image data are supplied from the page memory 109 through the printer interface 104 to the printer 102 to obtain the image of a page (S193, S194).

In the above-explained embodiment, in case of transmitting a monochromatic image, the luminance signal Y generated from the R, G, B signals in the color/monochrome conversion unit 202 is used as the monochromatic signal, but it is also possible to select one of the R, G and B signals as the monochromatic signal. Such method allows to dispense with the color/monochrome conversion unit 202, thereby simplifying the structure of the scanner interface. In such structure, the obtained monochromatic may be inappropriate in case of transmitting a color image in the monochromatic state, but, in such case it is also possible to visually inspect the obtained monochromatic image on display, and, if it is considered inappropriate, to prepare a corrected monochromatic image for resending.

Also the rigid disk for image storage may be replaced by a semiconductor memory such as a DRAM, or by a magnetooptical disk.

It is also possible to dispense with the page memory 109 for storing the uncompressed image, and to effect all the image transfers from the image memory (rigid disk).

It is furthermore possible, at the original image reading, to transmit the read image directly from the CCU, without storage in the image memory, or, also at the original image reading, to store the image in the image memory in a state of binary uncompressed image.

As explained in the foregoing, the present embodiment enables to display the image on the display unit at the image transmission, and, in case of transmission of a monochromatic image, to select certain component as monochromatic signal from the color image signal obtained from the scanner, thereby providing advantages of dispensing with the conversion from the color image to the black-and-white image and thus simplifying the circuit structure.

What is claimed is:

1. An image communication apparatus comprising:

receiving means for receiving compressed image data from an external device by using a predetermined protocol;

a memory for temporarily storing the compressed image data;

decoding means for decoding the compressed image data by using a color decoding method when the compressed image data stored in said memory is color-compressed data and decoding the compressed image data by using a monochrome decoding method when the compressed image data stored in said memory is monochrome-compressed data;

first controlling means for causing a predetermined display means to display a color/monochrome image indicated by the compressed image data received by said receiving means; and second controlling means for causing a predetermined image forming means to form an image obtained by the decoding of said decoding means, wherein said first controlling means and said second controlling means are selectively used.

2. An apparatus according to claim 1, wherein said display means displays whether the compressed image data is received in a color receiving mode or the compressed image data is received in a monochrome receiving mode.

3. An apparatus according to claim 1, wherein the image forming of the image by said image forming means is performed after the display of the image by said display means is performed.

4. An apparatus according to claim 1, wherein the display of the image by said display means is performed after the image forming of the image by said image forming means is performed.

5. An image communication method comprising:

a receiving step of receiving compressed image data from an external device by using a predetermined protocol;

a storing step of temporarily storing the compressed image data;

a decoding step of decoding the compressed image data by using a color decoding method when the compressed image data stored in said storing step is color-compressed data and decoding the compressed image data by using a monochrome decoding method when the compressed image data stored in said storing step is monochrome-compressed data;

a first controlling step of causing a predetermined display device to display a color/monochrome image indicated by the compressed image data received by said receiving step; and a second controlling step of causing a predetermined image forming device to form an image obtained by the decoding of said decoding step, wherein said first controlling step and said second controlling step are selectively used.

6. An image communication apparatus comprising:

communication means for transmitting or receiving compressed image data;

first controlling means for causing a predetermined display means to display an image indicated by the compressed image data as a color image when the compressed image data to be transmitted by said communication means is color compressed data, and to display the image indicated by the compressed image data as a monochrome image when the compressed image data to be transmitted by said communication means is monochrome compressed data;

expanding means for color expanding or monochrome expanding the compressed image data;

second controlling means for causing said predetermined display means to display the image indicated by the compressed image data received by said communication means; and third controlling means for causing a predetermined image forming means to form an image indicated by the compressed image data received by said communication means, wherein said second controlling means and said third controlling means are selectively used.

7. An apparatus according to claim 6, wherein a selection of said second controlling means and said third controlling means is executed on the basis of a manual operation.

8. An image communication method comprising:

a communication step of transmitting or receiving compressed image data;

a first controlling step of causing a predetermined display device to display an image indicated by the compressed image data as a color image when the compressed image data to be transmitted by said communication step is color compressed data, and to display the image indicated by the compressed image data as a monochrome image when the compressed image data to be transmitted by said communication step is monochrome compressed data;

an expanding step of color expanding or monochrome expanding the compressed image data;

a second controlling step of causing said predetermined display device to display the image indicated by the compressed image data received by said communication step; and a third controlling step of causing a predetermined image forming device to form an image indicated by the compressed image data received by said communication step, wherein said second controlling step and said third controlling step are selectively used.

* * * * *

UNITED STATES PATENT AND TRADEMARK OFFICE
CERTIFICATE OF CORRECTION

PATENT NO. : 5,661,576

DATED : August 26, 1997

INVENTOR : YOJI KANEKO

It is certified that error appears in the above-identified patent and that said Letters Patent is hereby corrected as shown below:

IN THE DRAWINGS

Sheet 19 of 21 FIG. 18B  "MAINTAINANCE" should read
     --MAINTENANCE--

COLUMN 1 line 19, "The conventional" should read --Conventional--
      and "are" should read --is--;
   line 26, "the" (first occurrence) should be deleted;
   line 27, "conducted" should read --printed--;
   line 29, "paper" should read --paper again--;
   line 37, "enabling to " should read --which can--;
   line 42, "the" should be deleted; and
   line 56, "image" should read --an image--.

COLUMN 2 line 1, "to be" should be deleted;
   line 7, "a scanner" should read --the scanner--;
   line 8, "in said embodiment;" should read
      --shown in FIG. 1;--
   line 9, "a display" should read --the display--;

UNITED STATES PATENT AND TRADEMARK OFFICE
CERTIFICATE Of CORRECTION

PATENT NO. : 5,661,576

DATED : August 26, 1997

INVENTOR : YOJI KANEKO

It is certified that error appears in the above-identified patent and that said Letters Patent is hereby corrected as shown below:

<u>COLUMN 2</u> cnontinued line 10, "in said embodiment;" should read --shown in FIG. 1;--;
line 11, "an encoder" should read --the decoder-- and "in" should read --shown in FIG. 1;--;
line 12, "said embodiment;" should be deleted;
line 14, "a decoder" should read --the decoder-- and "in said" should read --shown in FIG. 1;--;
line 15, "embodiment;" shold be deleted;
line 16, "schematic view" should read --diagram--;
line 17, "a" should read --the-- and "in said embodiment,;" should read --shown in FIG. 1;--;
line 18, "schematic view" should read --diagram--;
line 19, "in said embodiment," should read --shown in Fig. 1;--;
line 20, "in said" should read --shown in FIG. 1;--;
line 21, "embodiment;" should be deleted;
line 22, "in" should read --on the--;
line 24, "a" should be deleted and "in said operation panel;" should read --shown in FIG. 1;--;
line 26, "in said embodiment;" should read --of the apparatus of FIG. 1;

UNITED STATES PATENT AND TRADEMARK OFFICE
CERTIFICATE Of CORRECTION

PATENT NO. : 5,661,576

DATED : August 26, 1997

INVENTOR : YOJI KANEKO

It is certified that error appears in the above-identified patent and that said Letters Patent is hereby corrected as shown below:

COLUMN 2 continued

```
line 30, "the" should be deleted;
line 31, "in said embodiment;" should read --time;--;
line 33, "the" should be deleted;
line 34, "in said embodiment;" should read --time--;
line 37, "said" should read --the apparatus of FIG. 1;--;
line 38, "embodiment;" should be deleted;
line 40, "said image" should read --the image;--;
line 41, "in said embodiment;" should be deleted;
line 43, "operation in said embodiment;" should read
         --operation;--;
line 45, "image in said embodi-" should read --image;--;
line 46, "ment;" should be deleted;
line 47, "a flow chart" should read --flow charts--;
line 48, "reception in said embodiment" should read
         --reception;--;
line 50, "subroutine" should read --subroutine;--;
line 51, "in said embodiemnt;" should be deleted;
line 52, "subroutine in said" should read --subroutine;
         and--;
line 53, "embodiment; and" should be deleted;
line 55, "subroutine in said embodiment." should read
         --subroutine.--; and
```

UNITED STATES PATENT AND TRADEMARK OFFICE
CERTIFICATE Of CORRECTION

PATENT NO. : 5,661,576

DATED : August 26, 1997

INVENTOR : YOJI KANEKO

It is certified that error appears in the above-identified patent and that said Letters Patent is hereby corrected as shown below:

COLUMN 2 continued line 62, "Said" should read --The--.

COLUMN 3 line 1, "from" should read --from a--;
   line 2, "binary" should read --a binary--;
   line 4, "said" should be deleted;
   line 8, "following explained are read" should read --following--;
   line 9, "apparatus." should read --apparatus are described--;
   line 10, "is capable of reading" should read --reads--;
   line 11, "release" should read --provides--;
   line 13, "is" should read --may be--;
   line 14, "compossed for example of" should be deleted;
   line 19, "there may be employed" should be deleted and "receiving" should read --may be employed which receives--;
   line 22, "on" should read --of--;
   line 24, "signals of" should read --siganls from--;

UNITED STATES PATENT AND TRADEMARK OFFICE
CERTIFICATE Of CORRECTION

PATENT NO. : 5,661,576

DATED : August 26, 1997

INVENTOR : YOJI KANEKO

It is certified that error appears in the above-identified patent and that said Letters Patent is hereby corrected as shown below:

COLUMN 3 continued

```
line 27, "Supply" should read --application--;
line 33, "disk" should read --disk 111--;
line 36, "on" should read --of--;
line 40, "said" should read --the-- and "composed"
         should read --composed of--;
line 44, "A" should read --The--;
line 51, "said" should read --the--;
line 53, "A" should read --The-- and "disk 111," should
         read --disk 111 is--;
line 54, "disk," should read --disk, which--;
line 56, "the" should be deleted;
line 66, "A CPU 119," should read --The CPU 113 is--; and
line 67, "data," should read --data, and--.
```

COLUMN 4

```
line 8,  "An" should read --The--;
line 11, "An" should read --The--;
line 13, "An" should read --The--;
line 15, "A" should read --The--;
line 22, "said" should read --the--;
line 24, "said" should read --the--;
line 25, "However" should read --However,--;
line 26, "method but" should read --a method and--;
```

UNITED STATES PATENT AND TRADEMARK OFFICE
CERTIFICATE Of CORRECTION

PATENT NO. : 5,661,576
DATED : August 26, 1997
INVENTOR : YOJI KANEKO

It is certified that error appears in the above-identified patent and that said Letters Patent is hereby corrected as shown below:

COLUMN 4 continued

```
line 27,  "G" should read --the G--;
line 28,  "aforementioned" should be deleted;
line 30,  "generate" should read --generates-- and
          "error" should read --an error--;
line 31,  "simple" should read --a simple-- and
          "Also" should read --Also,--;
line 33,  "205," should read --205 and-- and
          "error" should read --an error--;
line 37,  "format" should read --RS232C format--;
line 38,  "RS232C" should be deleted;
line 44,  "internal" should read --an internal--;
line 52,  "to the" should read --in storage size to
           the display size of--;
line 63,  "of" should read --of a--; and
line 67,  "Also" should read --Also,-- and
          "said" should read --the--.
```

COLUMN 5

```
line 2,   "said" should read --the--;
line 6,   "given from" should read --as controlled
           by-- and "transfer said" should read
           --transfers the--;
line 9,   "on said" should read --of the-- and
          "and on" should read --and of--;
```

UNITED STATES PATENT AND TRADEMARK OFFICE
CERTIFICATE OF CORRECTION

PATENT NO. : 5,661,576
DATED : August 26, 1997
INVENTOR : YOJI KANEKO

It is certified that error appears in the above-identified patent and that said Letters Patent is hereby corrected as shown below:

COLUMN 5 continued line 12, "on" should read --of--;
    line 14, "control" should read --controls-- and "the" should be deleted;
    line 15, "the character" should read --character--;
    line 17, "Also" should read --Also,--;
    line 29, "the" should read --a--;
    line 50, "Also" should read --Also,--;
    line 56, "operations at" should read --operation in a--;
    line 64, "erased" should read --erased (S4)--; and
    line 66, "the step S1" should read --step S1--.

COLUMN 6 line 11, "said" should read --the--;
    line 23, "said" should read --the--; and "by" should read --for--;
    line 29, "achieved" should read --achieved,--;
    line 30, "example" should read --example,--;
    line 34, "G3" should read --a G3--;
    line 48, "Also" should read --Also,--;

UNITED STATES PATENT AND TRADEMARK OFFICE
CERTIFICATE Of CORRECTION

PATENT NO. : 5,661,576

DATED : August 26, 1997

INVENTOR : YOJI KANEKO

It is certified that error appears in the above-identified patent and that said Letters Patent is hereby corrected as shown below:

COLUMN 6 continued line 60, "aforementioned" should be deleted; and
   line 65, "by" should read --for--.

COLUMN 7 line 4, "standard," should read --standard, and which is--;
   line 8, "the instruction of" should read --an instruction from--;
   line 14,"505, 506" should read --505 and 506--;
   line 16,"an operation" should read --the operation--;
   line 18,"image" should read --images--;
   line 19,"and" should read --and which is--;
   line 21,"dialling," should read --dialing,--;
   line 26,"is informed" should read --provides a signal--;
   line 32,"the signal" should read --data representative--;
   line 36,"CPU 112 (S23)." should read --CCU 112 (S23).--;
   line 47,"(S31), should read --(S31), displayed (S32),--;
   line 59,"(S44-S46'," should read --(S44-S46,--; and
   line 60,"gives" should read --provides--.

COLUMN 8 line 15,"said" should read --the--;
   line 17,"a" should be deleted;

UNITED STATES PATENT AND TRADEMARK OFFICE
CERTIFICATE Of CORRECTION

PATENT NO. : 5,661,576

DATED : August 26, 1997

INVENTOR : YOJI KANEKO

It is certified that error appears in the above-identified patent and that said Letters Patent is hereby corrected as shown below:

COLUMN 8 continued

```
line 20, "color" should read --a color--;
line 32, "dialling" should read --dialing--;
line 46, "release" should read --sends--;
line 49, "then" should read --and--;
line 59, "turned on" should read --actuted--;
line 60, "instructed" should read --designated--; and
line 62, "Also" should read --Also,--.
```

COLUMN 9

```
line 5,  "there is discriminated" should read --a dis-
         crimination is made as to--;
line 27, "the" (first occurrence) should be deleted;
line 32, "said" should read --the--;
line 42, "receiving" should read --a receiving--;
line 47, "said" should read --the--;
line 49, "destination," should read --the destination,--;
line 54, "these" should read --the--;
line 60, "obtained," should read --receives-- and
         "aforementioend" should be deleted; and
line 61, "destination," should read --the destination,--.
```

UNITED STATES PATENT AND TRADEMARK OFFICE
CERTIFICATE Of CORRECTION

PATENT NO. : 5,661,576

DATED : August 26, 1997

INVENTOR : YOJI KANEKO

It is certified that error appears in the above-identified patent and that said Letters Patent is hereby corrected as shown below:

<u>COLUMN 10</u> line 7, "the" (second occurrence) should be deleted;
   line 15, "same" should read --the same--;
   line 16, "said" should read --the--;
   line 17, "said should read --the--;
   line 20, "print out" should read --printout--;
   line 28, "said" should read --the--;
   line 32, "said" should read --the--;
   line 34, "revised" should read --the revised--;
   line 47, "there is discriminated" should read
         --a discrimination is made--;
   line 48, "then," should read --and,--;
   line 59, "said" should read --the,--; and
   line 61, "first" should read --first,--.

<u>COLUMN 11</u> line 4, "Said" should read --The-- and "stored also"
         should read --also stored--;
   line 13, "said should read --the--;
   line 15, "released for" should read --provided to--;
   line 21, "uncopressed" should read --uncompressed--;
         and "through" should read --via--;
   line 22, "print out." should read --printout.--;
   line 29, "said" should read --the--;

UNITED STATES PATENT AND TRADEMARK OFFICE
CERTIFICATE Of CORRECTION

PATENT NO. : 5,661,576

DATED : August 26, 1997

INVENTOR : YOJI KANEKO

It is certified that error appears in the above-identified patent and that said Letters Patent is hereby corrected as shown below:

<u>COLUMN 11</u> continued

```
line 30, "first" should read --first,--;
line 32, "given" should read --sent--;
line 45, "monochromatic" should read monochromatic
         image--;
line 46, "case" should read --the case--;
line 47, "case" should read --a case--;
line 51, "Also" should read --Also,--;
line 61, "binary" should read --a binary--;
line 63, "the image" (second occurrence) should read
         --the time of image-- and
line 65, "monochromatic" should read --a monochromatic--.
```

UNITED STATES PATENT AND TRADEMARK OFFICE
CERTIFICATE OF CORRECTION

PATENT NO. : 5,661,576

DATED : August 26, 1997

INVENTOR : YOJI KANEKO

It is certified that error appears in the above-identified patent and that said Letters Patent is hereby corrected as shown below:

<u>COLUMN 13</u> line 1,   "color compressed" should read --color-compressed--.

<u>COLUMN 14</u> line 5,   "color compressed" should read --color-compressed--.

Signed and Sealed this

Twenty-eighth Day of April, 1998

Attest:

BRUCE LEHMAN

*Attesting Officer*      *Commissioner of Patents and Trademarks*